(12) United States Patent
Yokoi et al.

(10) Patent No.: US 11,041,580 B2
(45) Date of Patent: Jun. 22, 2021

(54) VALVE AND FLUID CONTROL DEVICE

(71) Applicant: Murata Manufacturing Co., Ltd., Kyoto (JP)

(72) Inventors: Hiroyuki Yokoi, Kyoto (JP); Daisuke Kondo, Kyoto (JP); Nobuhira Tanaka, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 471 days.

(21) Appl. No.: 15/492,540

(22) Filed: Apr. 20, 2017

(65) Prior Publication Data

US 2017/0218949 A1    Aug. 3, 2017

Related U.S. Application Data

(63) Continuation of application No. PCT/JP2015/078140, filed on Oct. 5, 2015.

(30) Foreign Application Priority Data

Oct. 23, 2014 (JP) .............................. JP2014-216161

(51) Int. Cl.
*F16K 99/00* (2006.01)
*F04B 45/047* (2006.01)
(Continued)

(52) U.S. Cl.
CPC ........ *F16K 99/0048* (2013.01); *F04B 39/102* (2013.01); *F04B 39/1026* (2013.01);
(Continued)

(58) Field of Classification Search
CPC .. F04B 53/102; F04B 39/102; F04B 39/1026; F04B 45/047; F04B 43/046; F16K 7/17;
(Continued)

(56) References Cited

U.S. PATENT DOCUMENTS 1,768,840 A * 7/1930 Holdsworth ............ F16K 15/16
137/516.11
3,550,616 A * 12/1970 Graham .................... F16F 9/34
137/513.7
(Continued)

FOREIGN PATENT DOCUMENTS

CN       102459899 A     5/2012
JP       S52-145825 A    12/1977
(Continued)

OTHER PUBLICATIONS

Notice of Reasons for Rejection issued in Japanese Patent Application No. 2016-555160, dated Feb. 20, 2018.
(Continued)

*Primary Examiner* — Christopher S Bobish
(74) *Attorney, Agent, or Firm* — Pearne & Gordon LLP

(57) ABSTRACT

A fluid control device (111) includes a valve section (12) and a blower section (13). The valve section (12) allows fluid to flow in one direction. The valve section (12) has the shape of a cylindrical container with a valve chamber (40) provided therein. The valve section (12) includes a top plate (21), a side-wall plate (22), a bottom plate (23), and a film (24). A plurality of ejection holes (41) and a plurality of auxiliary holes (49) arranged in a predetermined pattern are formed in a central region of the top plate (21). A plurality of communication holes (43) arranged in a predetermined pattern are formed in a central region of the bottom plate (23). A plurality of film holes (42) arranged in a predetermined pattern are formed in a central region of the film (24).

20 Claims, 20 Drawing Sheets

(51) Int. Cl.
*F04B 39/10* (2006.01)
*F16K 7/12* (2006.01)
*F04B 43/04* (2006.01)
*F16K 7/17* (2006.01)
*F04B 53/10* (2006.01)
*F04B 53/06* (2006.01)
*F16K 15/14* (2006.01)

(52) U.S. Cl.
CPC .......... *F04B 43/046* (2013.01); *F04B 45/047* (2013.01); *F04B 53/06* (2013.01); *F04B 53/10* (2013.01); *F16K 7/12* (2013.01); *F16K 7/17* (2013.01); *F16K 15/145* (2013.01); *F16K 99/0015* (2013.01); *F16K 2099/0094* (2013.01)

(58) Field of Classification Search
CPC .... F16K 7/12; F16K 99/0015; F16K 99/0048; F16K 2099/0094
See application file for complete search history.

(56) References Cited

U.S. PATENT DOCUMENTS

| | | | | |
|---|---|---|---|---|
| 4,039,002 A * | 8/1977 | Broyan | ................ | F04B 39/108 137/516.17 |
| 4,130,131 A * | 12/1978 | Kucenty | ............... | F04B 39/106 137/512.1 |
| 4,164,238 A | 8/1979 | Riedel | | |
| 4,483,363 A * | 11/1984 | Madoche | ............ | F04B 39/1033 137/329.04 |
| 8,141,573 B2 * | 3/2012 | Tai | ..................... | F16K 99/0005 137/15.19 |
| 9,109,592 B2 * | 8/2015 | Fujisaki | ................ | F04B 45/047 |
| 9,797,392 B2 * | 10/2017 | Locke | ................... | F04B 43/023 |
| 10,087,923 B2 * | 10/2018 | Campbell | ............. | F04B 19/006 |
| 2009/0232682 A1 * | 9/2009 | Hirata | ................... | F04B 43/046 417/413.2 |
| 2010/0310398 A1 * | 12/2010 | Janse Van Rensburg | ................... | F04B 43/04 417/488 |
| 2011/0076170 A1 * | 3/2011 | Fujisaki | ................ | F04B 45/047 417/415 |
| 2013/0071269 A1 | 3/2013 | Fujisaki | | |
| 2013/0236338 A1 * | 9/2013 | Locke | ................... | F04B 43/023 417/413.1 |
| 2015/0150470 A1 * | 6/2015 | Sano | ..................... | F04B 43/046 600/498 |

FOREIGN PATENT DOCUMENTS

| | | |
|---|---|---|
| JP | H03-54383 A | 3/1991 |
| JP | H09-100784 A | 4/1997 |
| JP | 2009-156253 A | 7/2009 |
| JP | 2012-528981 A | 11/2012 |
| WO | 2010/139918 A1 | 12/2010 |
| WO | 2011/040320 A1 | 4/2011 |
| WO | 2011/095795 A1 † | 8/2011 |

OTHER PUBLICATIONS

International Search Report issued in Application No. PCT/JP2015/078140 dated Dec. 28, 2015.
Written Opinion issued in Application No. PCT/JP2015/078140 dated Dec. 28, 2015.

\* cited by examiner
† cited by third party

VALVE AND FLUID CONTROL DEVICE

This is a continuation of International Application No. PCT/JP2015/078140 filed on Oct. 5, 2015 which claims priority from Japanese Patent Application No. 2014-216161 filed on Oct. 23, 2014. The contents of these applications are incorporated herein by reference in their entireties.

FIELD OF THE DISCLOSURE

The present disclosure relates to a valve that allows fluid to flow in one direction and a fluid control device including the valve.

DESCRIPTION OF THE RELATED ART

Various types of fluid control devices that control the flow of fluid have been disclosed. Patent Document 1, for example, discloses a piezoelectric micro-blower including a vibrating plate, a piezoelectric element that generates bending vibration of the vibrating plate, and a top plate having a plurality of openings. This piezoelectric micro-blower generates bending vibration of the vibrating plate by using the piezoelectric element, thereby sucking in ambient air and ejecting the air to the outside through the openings.

Since the piezoelectric micro-blower includes a plurality of openings, noise generated near the openings (wind noise) can be reduced.

Patent Document 1: International Publication No. 2011/40320 pamphlet

BRIEF SUMMARY OF THE DISCLOSURE

Although the piezoelectric micro-blower according to Patent Document 1 includes a plurality of openings, the maximum ejection flow rate thereof is as low as 1.1 (L/min) (see FIG. 9 of Patent Document 1). Thus, the piezoelectric micro-blower has a low ejection flow rate and pressure.

Accordingly, when a valve for preventing backflow of air is attached to the openings of the piezoelectric micro-blower so that the air ejected from the openings flows in one direction, the valve is required to have a low flow passage resistance. This is because the air discharged through the openings in the piezoelectric micro-blower and ejected from the valve through passages in the valve is reduced in flow rate and pressure due to the flow passage resistance of the valve.

An object of the present disclosure is to provide a valve and a fluid control device that allow gas ejected from a blower to pass therethrough while minimizing reductions in the flow rate and pressure of the gas.

A valve according to the present disclosure includes a first plate, a second plate, and a film. The first plate has a first vent hole. The second plate defines a valve chamber, which is connected to the first vent hole, between the second plate and the first plate. The second plate has a second vent hole that is connected to the valve chamber and that does not oppose the first vent hole. The film is disposed between the first plate and the second plate. The film has a third vent hole that does not oppose the first vent hole and that is opposed to the second vent hole.

The second plate has an auxiliary hole that is overlapped with the first vent hole in a front view of a principal surface of the second plate, the principal surface facing the valve chamber.

In this structure, the first vent hole is connected to, for example, an ejection hole of a blower, and the second vent hole is, for example, opened to the atmosphere.

In this structure, while the blower is in operation, a portion of the film that faces the auxiliary hole is deformed into the auxiliary hole due to gas ejected into the valve chamber through the first vent hole. Accordingly, the gap between the first plate and the portion of the film increases. As a result, the flow passage resistance of the valve is lower and the flow rate and pressure of the gas are higher than those in the case where the second plate does not have the auxiliary hole.

Thus, the valve having the above-described structure allows the gas ejected from the blower to pass therethrough while minimizing reductions in the flow rate and pressure of the gas.

In the valve according to the present disclosure, a central axis of the auxiliary hole preferably coincides with a central axis of the first vent hole.

According to this structure, in a front view of the principal surface of the second plate that faces the valve chamber, the area in which the auxiliary hole is overlapped with the first vent hole is larger than that in the case where the central axes do not coincide. Therefore, in this structure, the flow passage resistance of the valve is reduced and the flow rate and pressure of the gas are increased.

In the valve according to the present disclosure, preferably, a plurality of the auxiliary holes are provided, and the second plate includes a crosspiece portion that is disposed between the auxiliary holes.

According to this structure, since the crosspiece portion is provided between the auxiliary holes, the film comes into contact with the crosspiece portion when the film is deformed. Thus, the crosspiece portion suppresses deformation of the film, thereby preventing the film from being damaged. As a result, the durability of valve is increased.

In the valve according to the present disclosure, a diameter of the auxiliary hole is preferably greater than a diameter of the first vent hole.

When the valve has such a structure, the flow rate of the gas is higher than that in the case where the diameter of the auxiliary hole is smaller than the diameter of the first vent hole.

When rh is a radius of the first vent hole, Rs is a radius of the auxiliary hole, r1 and r2 are radii of two second vent holes that are on both sides of the auxiliary hole, and a is a distance between center points of the two of the second vent holes that are on both sides of the auxiliary hole, the following expression is satisfied: $\{a-(r1+r2)\}/2 > Rs \geq rh$.

In the valve according to the present disclosure, a diameter of the auxiliary hole is preferably smaller than a diameter of the first vent hole.

When the valve has such a structure, the pressure of the gas is higher than that in the case where the diameter of the auxiliary hole is greater than the diameter of the first vent hole.

A fluid control device according to the present disclosure includes the above-described valve according to the present disclosure and a blower. The blower includes a blower chamber connected to the first vent hole, a vibrating body that faces the blower chamber, and a driving body that generates bending vibration of the vibrating body.

The fluid control device according to the present disclosure includes the above-described valve according to the present disclosure, and therefore has an effect similar to that of the valve.

The vibrating body preferably includes a peripheral region and a central region. The peripheral region extends from an outermost one of nodes of pressure vibration generated in the blower chamber by the bending vibration of the vibrating body to an outer periphery of the blower chamber. The central region is located inside the peripheral region. The peripheral region is a region in which the bending vibration of the central region is suppressed.

The present disclosure enables gas ejected from a blower to flow while reductions in the flow rate and pressure of the gas are minimized.

DETAILED DESCRIPTION OF THE DISCLOSURE

First Embodiment

A fluid control device 111 according to a first embodiment of the present disclosure will now be described.

Figure 1:
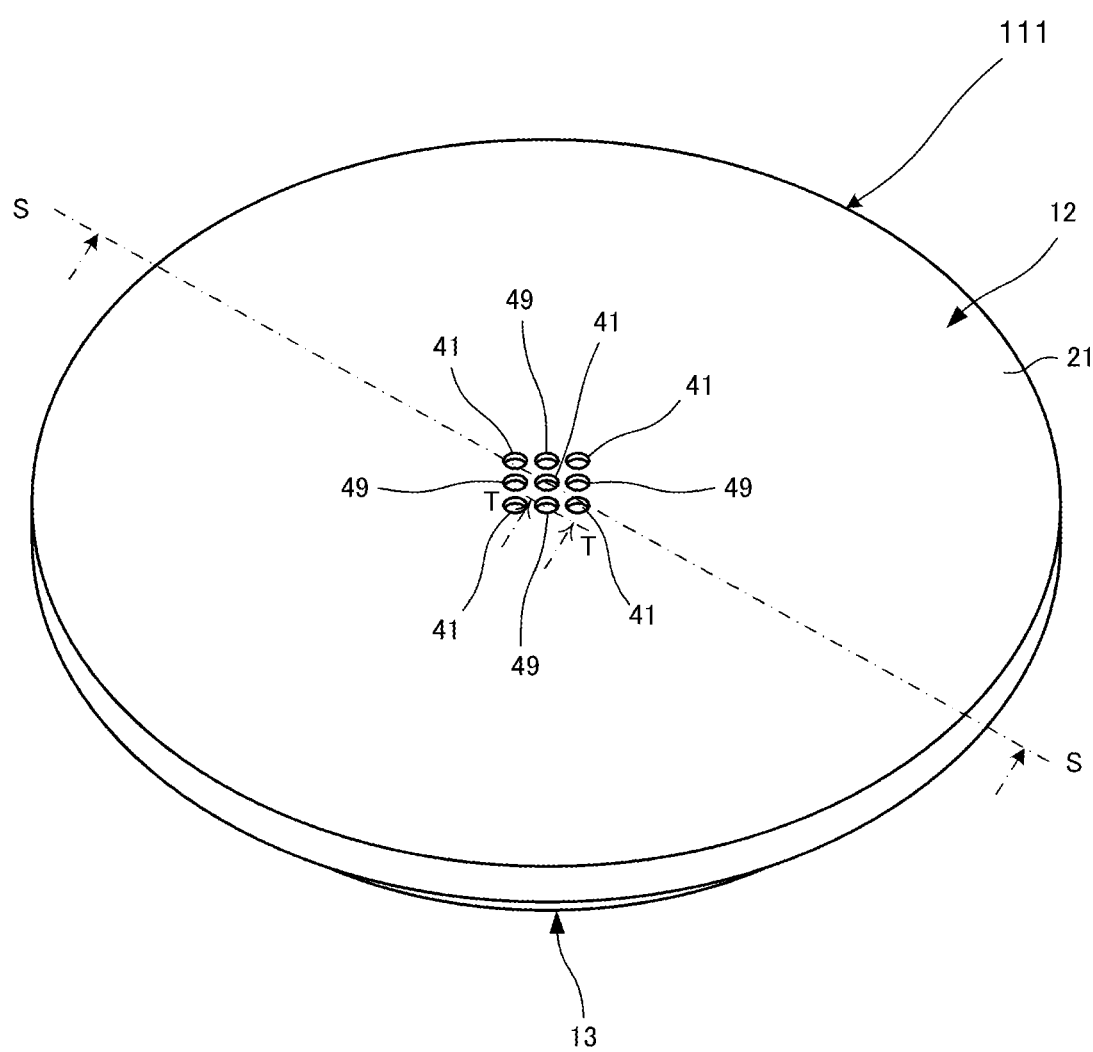
FIG. 1 is an external perspective view of a fluid control device 111 according to a first embodiment of the present disclosure viewed from the top side of the fluid control device 111.
Figure 2:
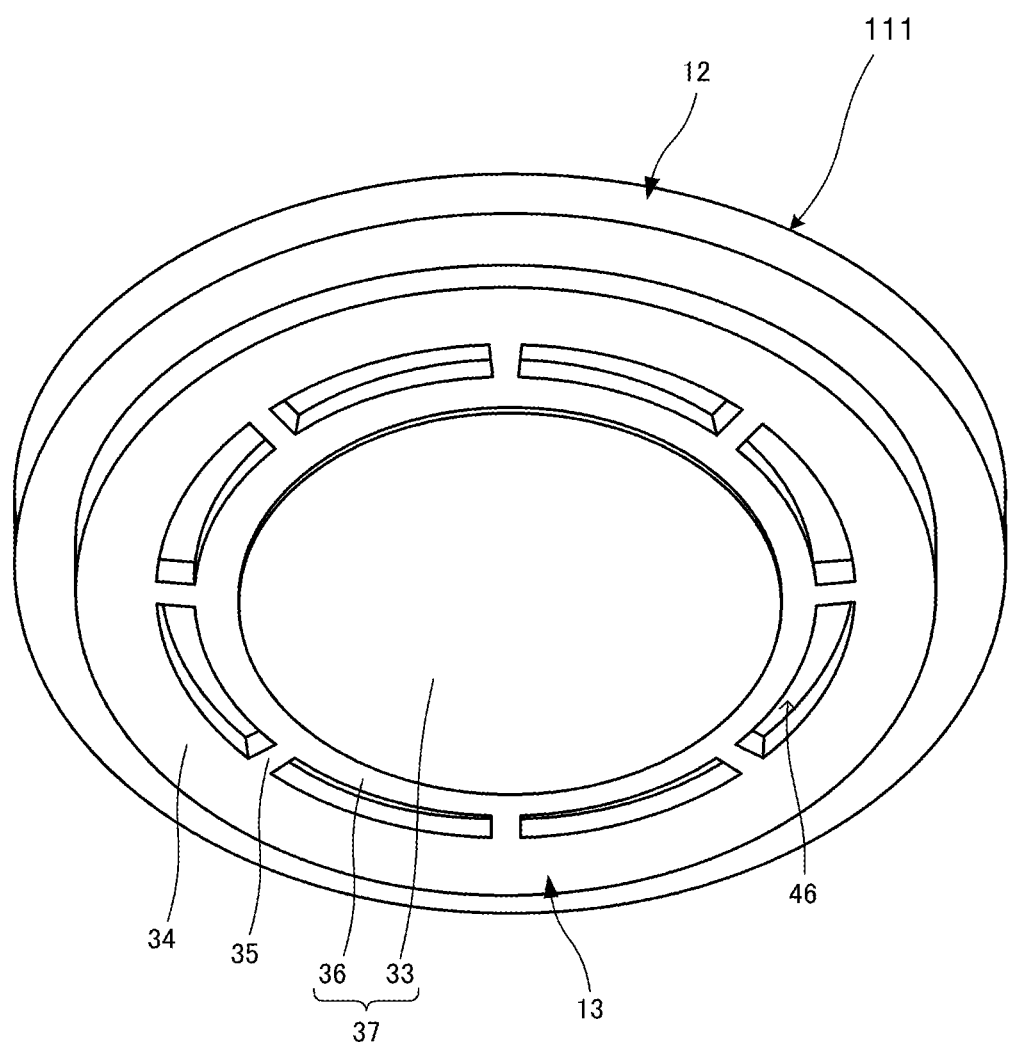
FIG. 2 is an external perspective view of the fluid control device 111 illustrated in FIG. 1 viewed from the bottom side of the fluid control device 111.
Figure 3:
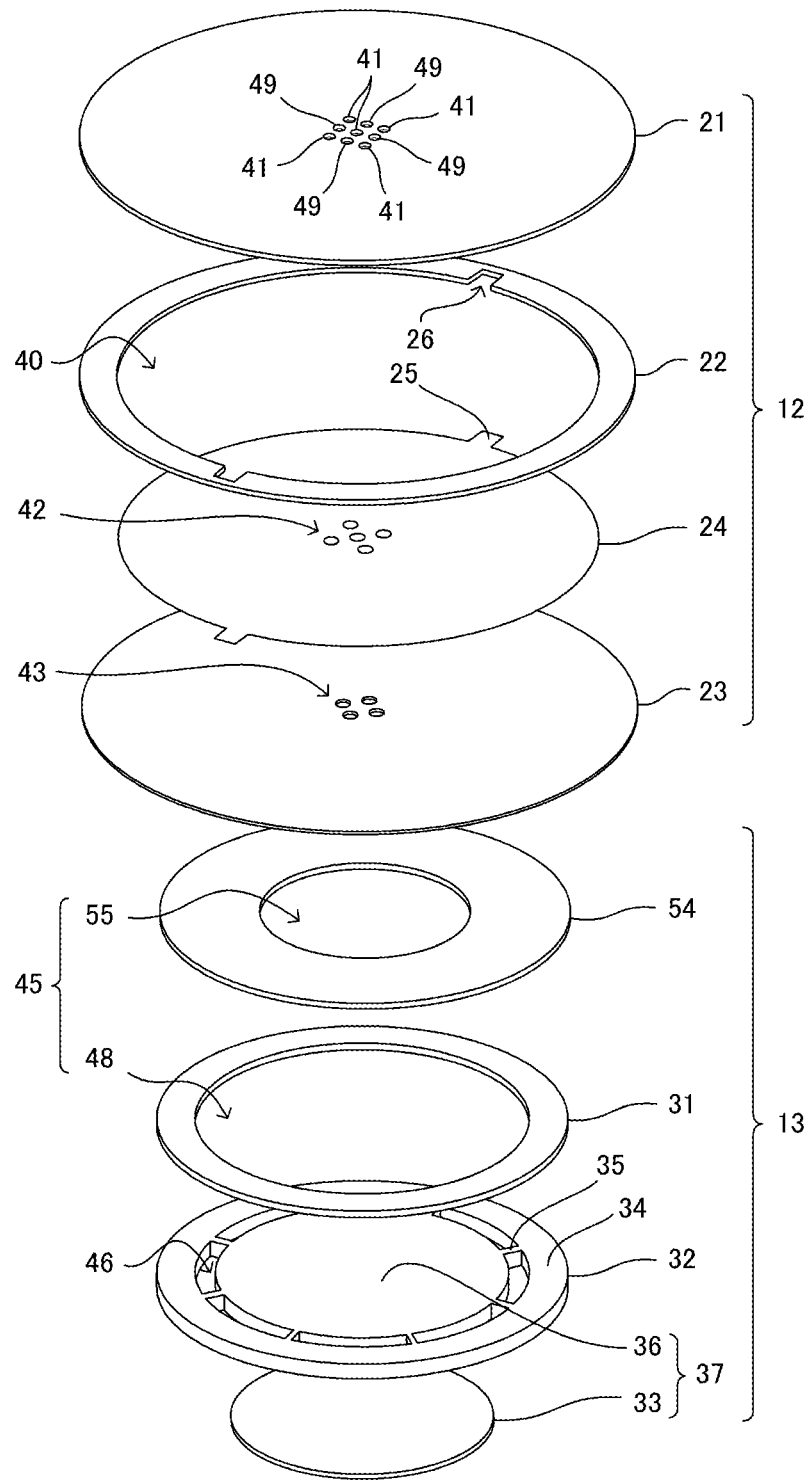
FIG. 3 is an exploded perspective view of the fluid control device 111 illustrated in FIG. 1.
Figure 4:
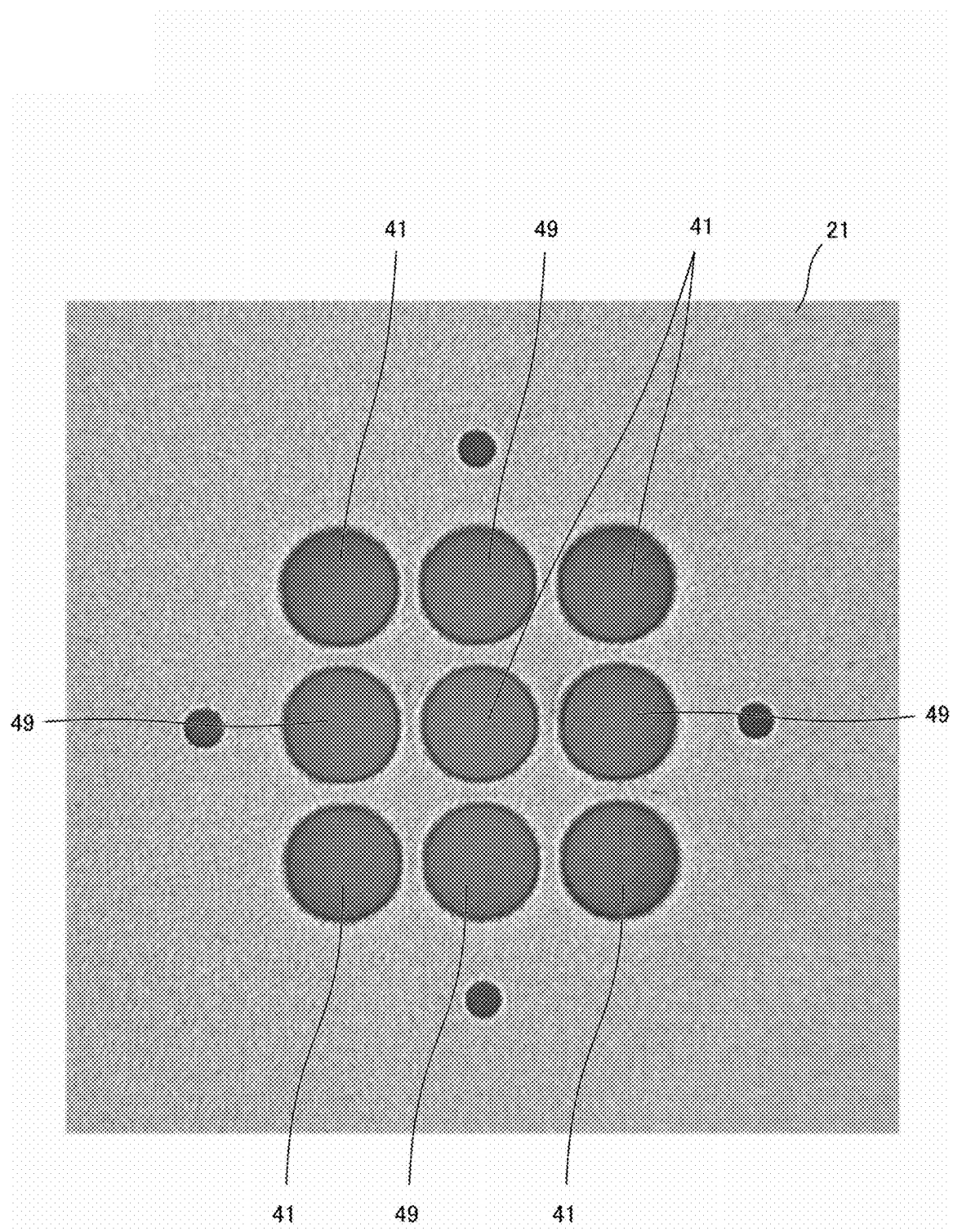
FIG. 4 is a front view of a central portion of a top plate 21 illustrated in FIG. 3.
Figure 5:
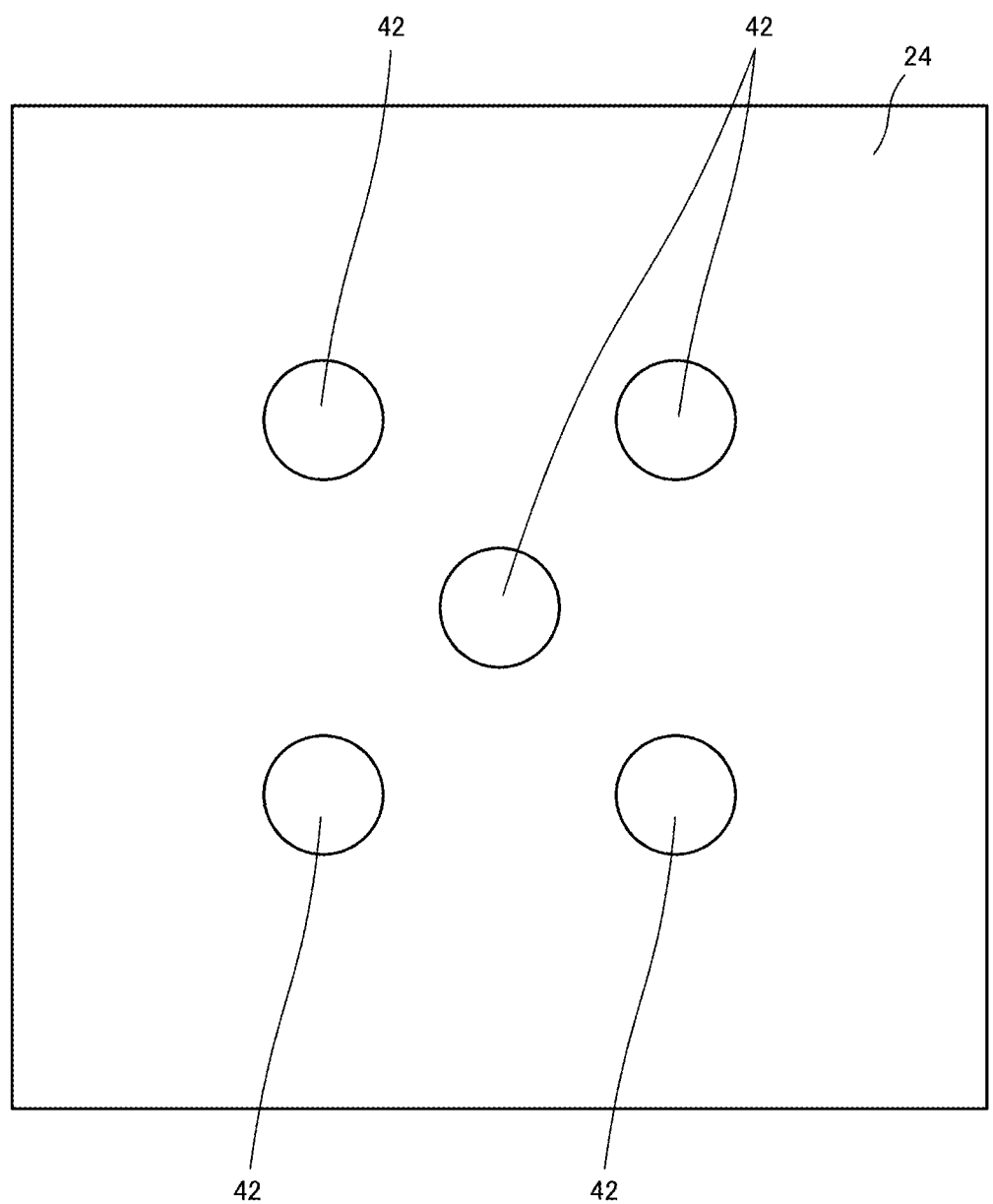
FIG. 5 is a front view of a central portion of a film 24 illustrated in FIG. 3.
Figure 6:
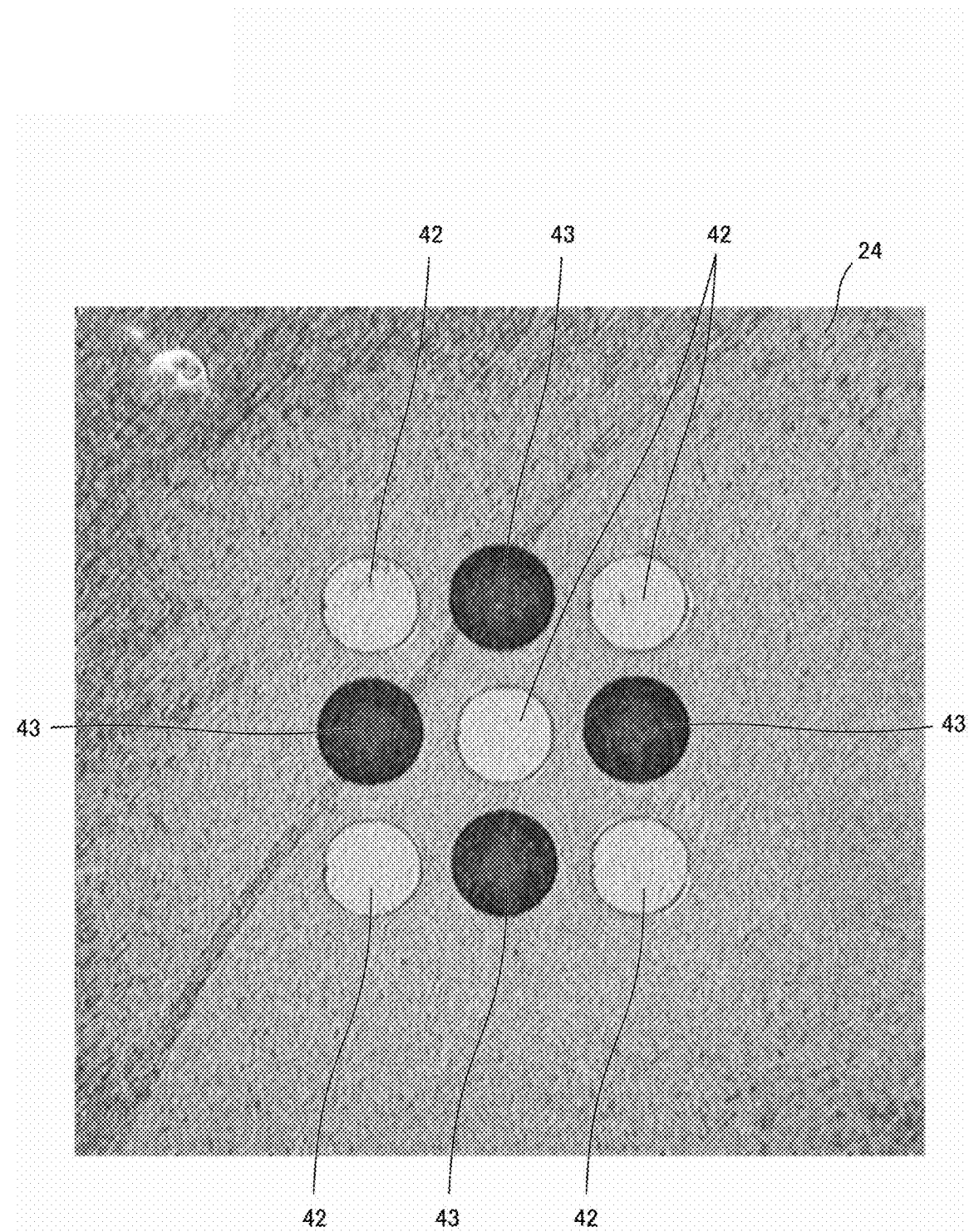
FIG. 6 is a front view of a central portion of the combination of the film 24 and a bottom plate 23 illustrated in FIG. 3.
Figure 7:
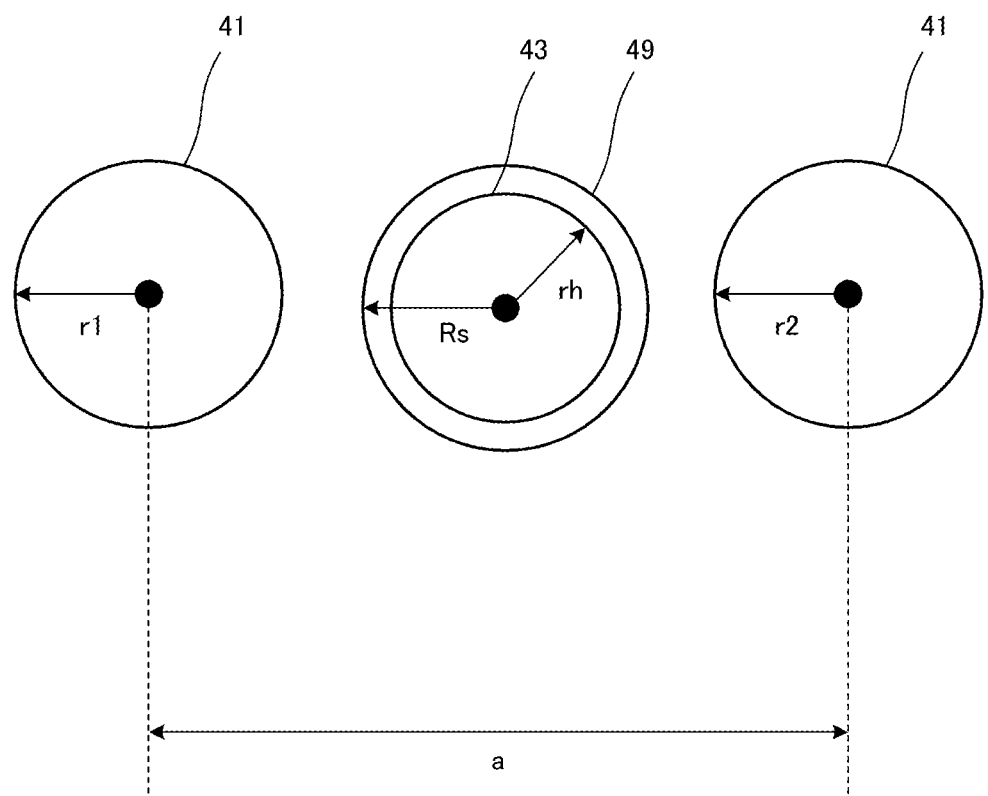
FIG. 7 is an enlarged front view of a communication hole 43, ejection holes 41, and an auxiliary hole 49 illustrated in FIG. 3.
Figure 8:
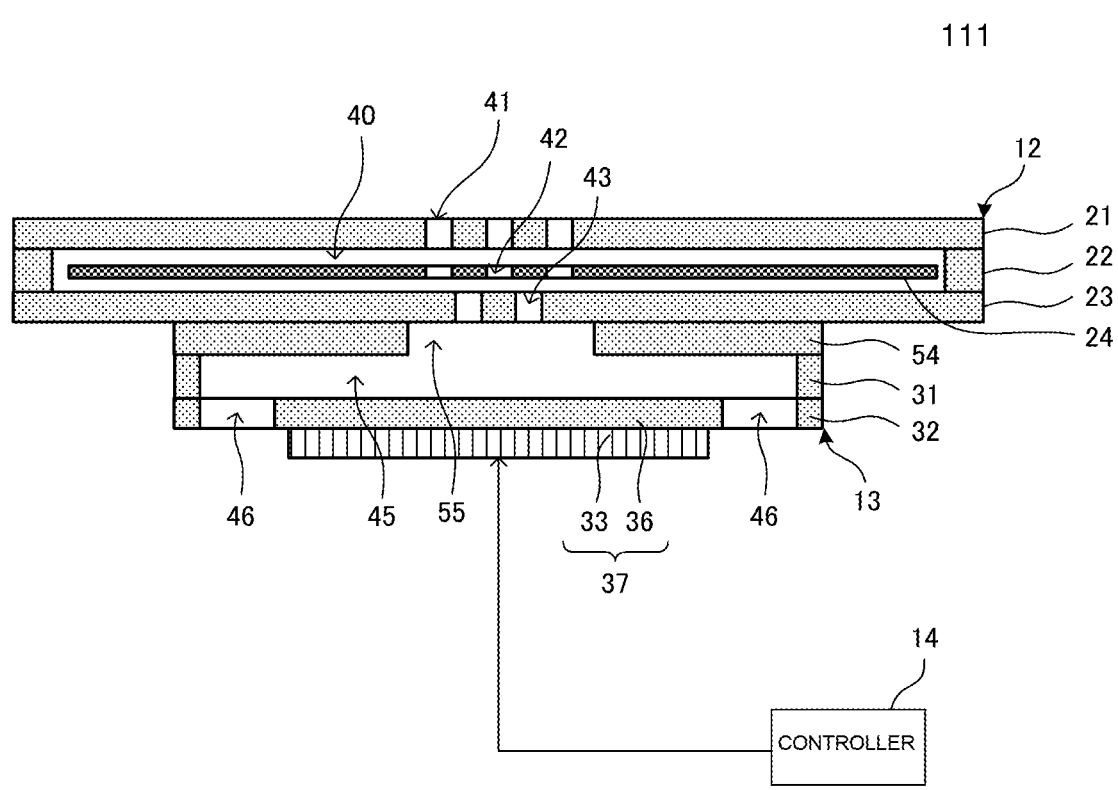
FIG. 8 is a sectional side view of the fluid control device 111 illustrated in FIG. 1.

FIG. 1 is an external perspective view of the fluid control device 111 according to the first embodiment of the present disclosure viewed from the top side of the fluid control device 111. FIG. 2 is an external perspective view of the fluid control device 111 illustrated in FIG. 1 viewed from below the bottom side of the fluid control device 111. FIG. 3 is an exploded perspective view of the fluid control device 111 illustrated in FIG. 1. FIG. 4 is a front view of a central portion of a top plate 21 illustrated in FIG. 3. FIG. 5 is a front view of a central portion of a film 24 illustrated in FIG. 3. FIG. 6 is a front view of a central portion of the combination of the film 24 and a bottom plate 23 illustrated in FIG. 3. FIG. 7 is an enlarged front view of a communication hole 43, ejection holes 41, and an auxiliary hole 49 illustrated in FIG. 3. FIG. 8 is a sectional view taken along line S-S in FIG. 1.

As illustrated in FIGS. 1 and 2, the fluid control device 111 includes a valve section 12, a blower section 13, and a controller 14 (seed FIG. 8). As illustrated in FIGS. 1 and 3, the valve section 12 is disposed at the top of the fluid control device 111. As illustrated in FIGS. 2 and 3, the blower section 13 is disposed at the bottom of the fluid control device 111. The valve section 12 and the blower section 13 are stacked and bonded together.

The valve section 12 allows fluid to flow in one direction. The valve section 12 has the shape of a cylindrical container with a valve chamber 40 provided therein. As illustrated in FIGS. 1 and 3, the valve section 12 includes the top plate 21, a side-wall plate 22, the bottom plate 23, and the film 24.

The bottom plate 23 corresponds to an example of a first plate according to the present disclosure. The top plate 21 corresponds to an example of a second plate according to the present disclosure. The bottom plate 23 also corresponds to an example of a vibrating body according to the present disclosure.

The top plate 21, the side-wall plate 22, and the bottom plate 23 are made of a metal. For example, the top plate 21, the side-wall plate 22, and the bottom plate 23 are made of a stainless steel (SUS). The film 24 is made of a resin. For example, the film 24 is made of a translucent polyimide.

The top plate 21 is disposed at the top of the valve section 12. The side-wall plate 22 is disposed between the top plate 21 and the bottom plate 23. The bottom plate 23 is disposed at the bottom of the valve section 12. The top plate 21, the side-wall plate 22, and the bottom plate 23 are stacked and bonded together. The film 24 is disposed in the valve section 12, that is, in the valve chamber 40.

The top plate 21 is disc-shaped when viewed from above. The side-wall plate 22 is annular when viewed from above. The bottom plate 23 is disc-shaped when viewed from above. The top plate 21, the side-wall plate 22, and the bottom plate 23 have the same outer diameter.

The valve chamber 40 is provided at the center of the side-wall plate 22 and has a predetermined opening diameter. The film 24 is substantially disc-shaped when viewed from above. The film 24 has a thickness smaller than that of the side-wall plate 22.

In the present embodiment, the thickness of the side-wall plate 22 (height of the valve chamber 40) is 40 µm or more and 50 µm or less, and the thickness of the film 24 is 5 µm or more and 10 µm or less. The film 24 is extremely light so as to be vertically movable in the valve chamber 40 upon receiving the air ejected from the blower section 13.

The outer diameter of the film 24 is substantially equal to the opening diameter of the valve chamber 40 in the side-wall plate 22, but it slightly smaller than the opening diameter so that a small gap is provided. Projections 25 are provided on the outer periphery of the film 24 (see FIG. 3). The side-wall plate 22 has cut portions 26 in the inner periphery thereof (see FIG. 3). The projections 25 are disposed in the respective cut portions 26 with small gaps therebetween. Thus, the film 24 is held in the valve chamber 40 in a non-rotatable and vertically movable manner.

A plurality of ejection holes 41 and a plurality of auxiliary holes 49 arranged in a predetermined pattern are formed in a central region of the top plate 21. A plurality of communication holes 43 arranged in a predetermined pattern are formed in a central region of the bottom plate 23. A plurality of film holes 42 arranged in a predetermined pattern are formed in a central region of the film 24. Thus, the valve chamber 40 communicates with the outside through the ejection holes 41, and with the blower chamber 45 through the communication holes 43.

The ejection holes 41 and the communication holes 43 are arranged so as not to be opposed to each other. The auxiliary holes 49 and the communication holes 43 are arranged so as to oppose each other. Each auxiliary hole 49 is overlapped with the corresponding communication hole 43 in a front view of the principal surface of the top plate 21 that faces the valve chamber 40. The central axis of each auxiliary hole 49 coincides with the central axis of the corresponding communication hole 43.

The film holes 42 and the ejection holes 41 are arranged so as to oppose each other. The film holes 42 and the auxiliary holes 49 are arranged so as not to be opposed to each other. The film holes 42 and the communication holes 43 are arranged so as not to be opposed to each other.

The communication holes 43 correspond to an example of a first vent hole according to the present disclosure. The ejection holes 41 correspond to an example of a second vent hole according to the present disclosure. The film holes 42 correspond to an example of a third vent hole according to the present disclosure.

The diameter of the auxiliary holes 49 is preferably greater than or equal to the diameter of the communication holes 43. More specifically, referring to FIG. 7, when the radius of the communication hole 43 is rh, the radius of the auxiliary hole 49 is Rs, the radii of the two ejection holes 41 on both sides of the auxiliary hole 49 are r1 and r2, and the distance between the center points of the two ejection holes 41 on both sides of the auxiliary hole 49 is a, the following relationship is satisfied: $\{a-(r1+r2)\}/2 > Rs \geq rh$.

The blower section 13 is a pump including a diaphragm 36 that is bent when a voltage is applied to a piezoelectric element 33. As illustrated in FIGS. 2 and 3, the blower section 13 has the shape of a cylindrical container with a blower chamber 45 provided therein.

The blower section 13 includes a vibration adjustment plate 54, a side-wall plate 31, a bottom plate 32, and a piezoelectric element 33. The vibration adjustment plate 54, the side-wall plate 31, and the bottom plate 32 are made of a metal. For example, the vibration adjustment plate 54, the side-wall plate 31, and the bottom plate 32 are made of a stainless steel.

The piezoelectric element 33 corresponds to an example of a driving body according to the present disclosure.

The side-wall plate 31 is disposed between the bottom plate 23 and the bottom plate 32. The bottom plate 32 is disposed between the side-wall plate 31 and the piezoelectric element 33. The piezoelectric element 33 is disposed at the bottom of the blower section 13. The side-wall plate 31 is stacked on and bonded to the bottom surface of the bottom plate 23. The side-wall plate 31, the bottom plate 32, and the piezoelectric element 33 are stacked and bonded together.

The vibration adjustment plate 54 is provided to adjust the vibration region of the bottom plate 23. More specifically, the vibration adjustment plate 54 is bonded between the bottom plate 23 and the side-wall plate 31. The vibration adjustment plate 54 is annular when viewed from above.

A blower upper chamber 55 having a predetermined opening diameter is formed in a central region of the vibration adjustment plate 54. The opening diameter of the blower upper chamber 55 is smaller than that of a blower lower chamber 48. The blower upper chamber 55 and the blower lower chamber 48 form the blower chamber 45. The vibration adjustment plate 54 and the side-wall plate 31 have the same outer diameter.

Since the vibration adjustment plate 54 is provided on the bottom plate 23, the rigidity is locally increased in the region around the outer peripheral portion of the bottom plate 23. Accordingly, the bottom plate 23 may be set so that only a central portion thereof that faces the blower upper chamber 55 vibrates and the outer peripheral portion thereof hardly vibrates.

Thus, the region in which the bottom plate 23 vibrates can be set in accordance with the opening diameter of the blower upper chamber 55 in the vibration adjustment plate 54. Accordingly, the vibration region and structural resonance frequency of the bottom plate 23 can be easily adjusted without changing, for example, the thickness or outer diameter of the bottom plate 23.

The vibration of the central portion of the bottom plate 23 mainly contributes to vibrations of the fluid and the film 24. Therefore, even when the outer peripheral portion of the bottom plate 23 does not vibrate, the responsivity and ejection flow rate of the valve section 12 can be sufficiently increased.

The side-wall plate 31 is annular when viewed from above. The blower lower chamber 48, which has a predetermined opening diameter, is formed in a central region of the side-wall plate 31. The bottom plate 32 includes an outer peripheral portion 34. The outer peripheral portion 34 is annular when viewed from above, and has an opening having a predetermined opening diameter in a central region of a principal surface when viewed from above.

The side-wall plate 31 and the outer peripheral portion 34 of the bottom plate 32 have the same outer diameter and the same opening diameter, and are stacked and bonded together. The outer diameter of the side-wall plate 31 and the bottom plate 32 is smaller than the outer diameter of the valve section 12 by a predetermined amount.

The bottom plate 32 includes a plurality of beam portions 35 and the diaphragm 36 in addition to the outer peripheral portion 34. The diaphragm 36 is disc-shaped when viewed from above, and is disposed in the opening in the outer peripheral portion 34 such that a gap is provided between the diaphragm 36 and the outer peripheral portion 34. The beam portions 35 are disposed in the gap between the outer peripheral portion 34 and the diaphragm 36. The beam portions 35 extend in the circumferential direction of the bottom plate 32 so as to connect the diaphragm 36 and the outer peripheral portion 34 to each other.

Thus, the diaphragm 36 is supported in the air by the beam portions 35, and is vertically movable in the thickness direction. The openings between the outer peripheral portion 34 and the diaphragm 36 serve as suction holes 46.

The piezoelectric element 33 is disc-shaped when viewed from above and has a radius smaller than that of the diaphragm 36. The piezoelectric element 33 is bonded to the bottom surface of the diaphragm 36. The piezoelectric element 33 is made of, for example, a lead zirconate titanate ceramic.

Electrodes (not shown) are formed on both principal surfaces of the piezoelectric element 33, and the controller 14 applies a driving voltage to the piezoelectric element 33 across these electrodes. The piezoelectric element 33 has piezoelectric properties, and therefore expands and contracts in a planar direction in accordance with the driving voltage applied thereto.

When the driving voltage is applied to the piezoelectric element 33, the piezoelectric element 33 expands and contracts in the planar direction and concentric bending vibration of the diaphragm 36 is generated. The bending vibration causes the beam portions 35, which elastically support the diaphragm 36, to vibrate, and accordingly the diaphragm 36 vibrates in the vertical direction. Thus, the piezoelectric element 33 and the diaphragm 36 form a piezoelectric actuator 37 and vibrate together.

The controller 14 is constituted by, for example, a microcomputer. In the present embodiment, the controller 14 adjusts the driving frequency of the piezoelectric element 33 to the resonance frequency of the blower chamber 45. The resonance frequency of the blower chamber 45 is a frequency at which pressure vibration that is being generated at the center of the blower chamber 45 and pressure vibration that has been generated at the center of the blower chamber 45, reflected by the outer peripheral portion, and returned to the center of the blower chamber 45 resonate.

When such an adjustment is made, a region around the center in the planar direction serves as an anti-node of the bending vibration, and a region near the outer periphery in the planar direction serves as a node of the bending vibration. Thus, a pressure distribution in the form of a standing wave in the planar direction is formed in the blower chamber 45.

Thus, the pressure variation of the fluid is large in a region near the communication holes 43 that are opposed to the central portion of the blower chamber 45 in the planar direction, and is extremely small in a region around the suction holes 46 that are opposed to the outer peripheral portion of the blower chamber 45 in the planar direction.

Therefore, if the suction holes 46 communicate with the outer peripheral portion of the blower chamber 45 in the planar direction, the pressure loss through the suction holes 46 can be substantially eliminated even when the suction holes 46 are not provided with a valve or the like. Therefore, the suction holes 46 can be formed in any shape or size, and the flow rate of the fluid can be increased.

The flow of air in the fluid control device 111 while the blower section 13 is in operation will now be described.

Figure 9A:
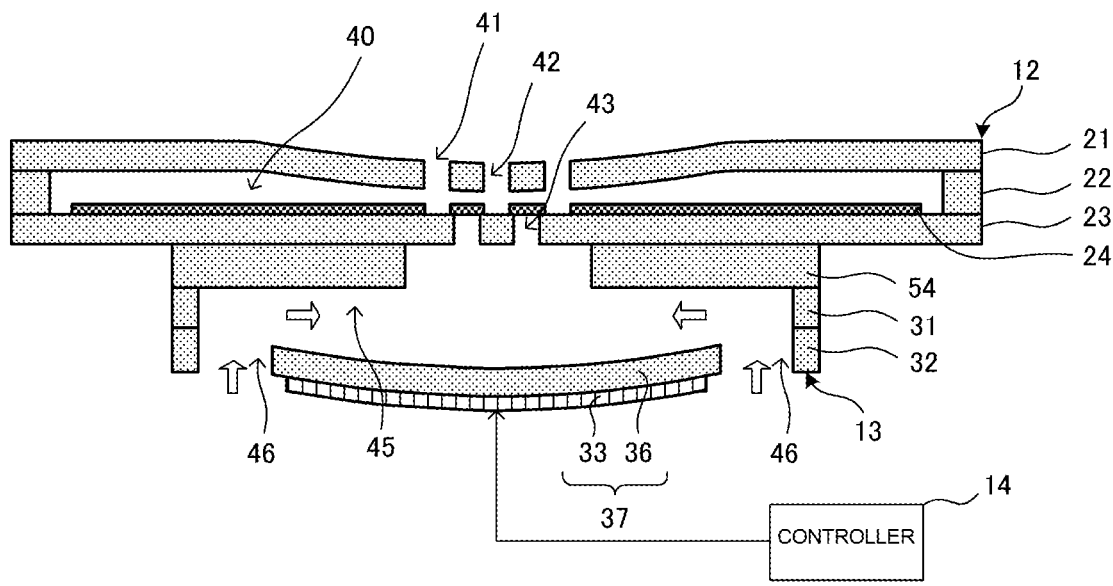
FIGS. 9A and 9B show sectional side views illustrating the flow of air in the fluid control device 111 while a blower section 13 illustrated in FIG. 1 is in operation.
Figure 9B:
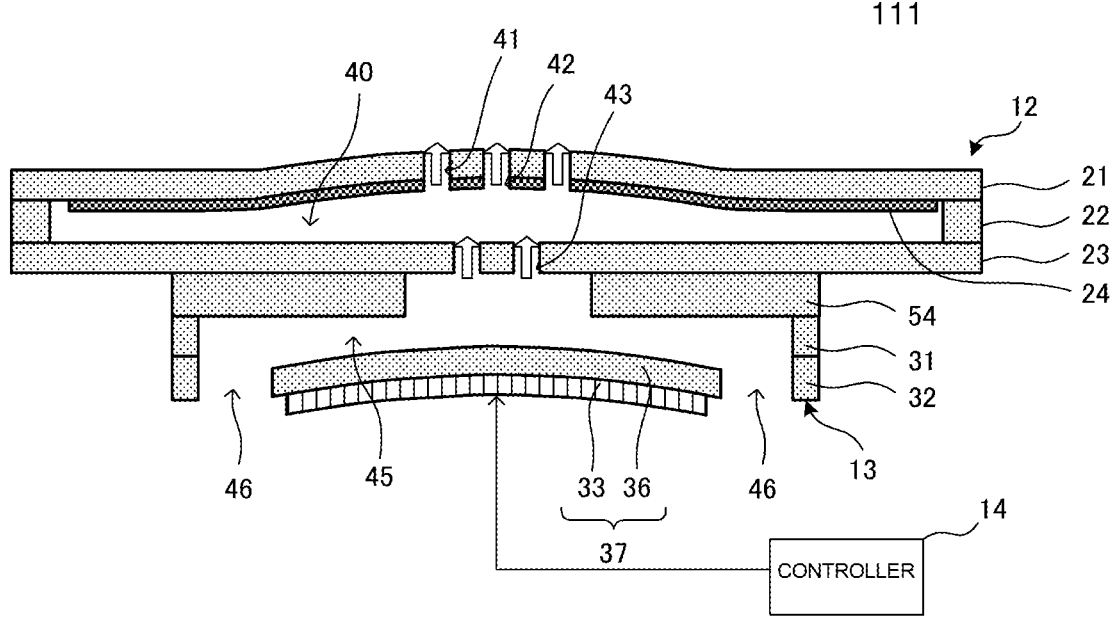
Figure 10:
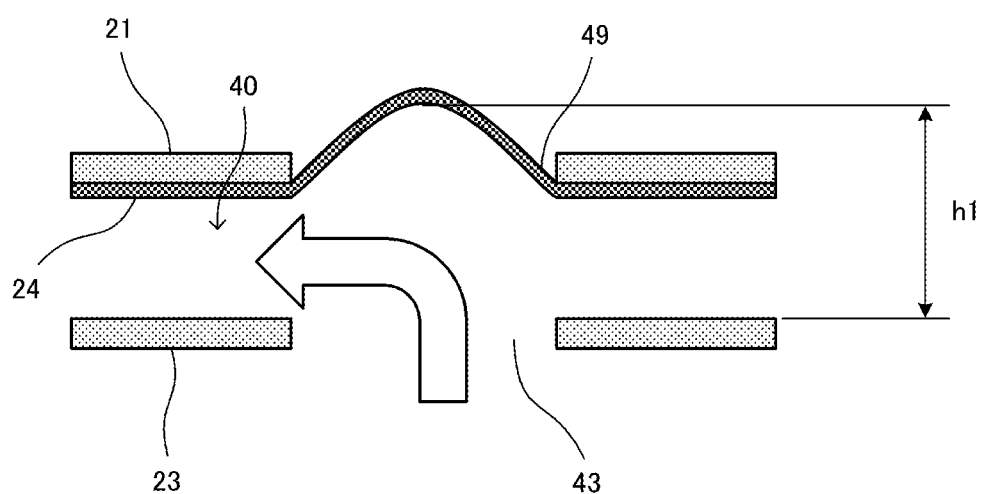
FIG. 10 is an enlarged sectional view illustrating the flow of air around an auxiliary hole 49 at the time of FIG. 9B.

FIGS. 9A and 9B show sectional side views illustrating the flow of air in the fluid control device 111 while the blower section 13 illustrated in FIG. 1 is in operation. FIG. 10 is an enlarged sectional view illustrating the flow of air around the auxiliary hole 49 at the time of FIG. 9B. The sectional view of FIG. 10 is taken along line T-T in FIG. 1. The arrows in FIGS. 9A, 9B and 10 indicate the flow of air.

When the controller 14 applies an alternating-current driving voltage across the electrodes on both principal surfaces of the piezoelectric element 33 in the state illustrated in FIG. 8, the piezoelectric element 33 expands and contracts, thereby generating a concentric bending vibration of the diaphragm 36. Accordingly, as illustrated in FIGS. 9A and 9B, the piezoelectric actuator 37 is bent and the volume of the blower chamber 45 periodically changes.

When the diaphragm 36 is bent downward as illustrated in FIG. 9A, the pressure in the blower chamber 45 decreases and the film 24 is pulled toward the bottom plate 23 and comes into contact with the bottom plate 23 in the valve chamber 40. Accordingly, the communication holes 43 are closed and the flow of air from the valve chamber 40 to the communication holes 43 is blocked. Accordingly, outside air is sucked into the blower chamber 45 through the suction holes 46.

When the diaphragm 36 is bent upward as illustrated in FIG. 9B, the pressure in the blower chamber 45 increases and air is ejected from the communication holes 43 toward the valve chamber 40. The film 24 is pushed upward by the ejected air and comes into contact with the top plate 21. Accordingly, the communication holes 43 are opened, so that the flow of the air is not blocked and the air flows into the valve chamber 40 through the communication holes 43. The air in the valve chamber 40 is ejected to the outside through the ejection holes 41 in the valve section 12.

The vibration of the piezoelectric actuator 37 is directly transmitted from the blower section 13 to the valve section 12, or is indirectly transmitted to the valve section 12 through the air. As a result, the top plate 21 is vibrated.

Accordingly, the top plate 21 is also elastically deformed so as to move vertically in the thickness direction. As illustrated in FIG. 9B, when the piezoelectric actuator 37 is bent upward and the air in the blower chamber 45 is ejected into the valve chamber 40 through the communication holes 43, the top plate 21 is also bent upward, similarly to the piezoelectric actuator 37. As a result, the volume of the valve chamber 40 increases.

As illustrated in FIG. 9A, when the piezoelectric actuator 37 is bent downward, the top plate 21 is bent downward as a rebound from the state illustrated in FIG. 9B. As a result, the volume of the valve chamber 40 decreases.

Accordingly, the distance by which the film 24 is pulled downward and the time required for the film 24 to move downward in the valve chamber 40 are reduced. This enables the film 24 to move in accordance with the air pressure variation and increases the responsivity of the valve section 12.

The bottom plate 23 may be vibrated due to the vibration of the piezoelectric actuator 37 that is directly transmitted from the blower section 13 or indirectly transmitted through the air.

As illustrated in FIG. 10, while the blower section 13 is in operation, a portion of the film 24 that faces each auxiliary hole 49 is deformed into the auxiliary hole 49 due to the air ejected into the valve chamber 40 through the corresponding communication hole 43 at the time of FIG. 9B. Accordingly, the gap h1 between the bottom plate 23 and the film 24 increases. As a result, the flow passage resistance of the valve section 12 is lower and the flow rate and pressure of the air are higher than those in the case where the top plate 21 does not have the auxiliary holes 49.

Thus, the fluid control device 111 and the valve section 12 allow the air ejected from the blower section 13 to pass therethrough while minimizing reductions in the flow rate and pressure of the air.

In the valve section 12, the central axis of each auxiliary hole 49 coincides with the central axis of the corresponding communication hole 43. Accordingly, in a front view of the principal surface of the top plate 21 that faces the valve chamber 40, the area in which each auxiliary hole 49 is overlapped with the corresponding communication hole 43 is larger than that in the case where the central axes do not coincide. Therefore, the flow passage resistance of the valve section 12 is reduced and the flow rate and pressure of the air are increased.

In the valve section 12, the diameter of the auxiliary holes 49 is greater than or equal to the diameter of the communication holes 43.

While the blower section 13 is in operation, portions of the film 24 that face the auxiliary holes 49 are deformed into the auxiliary holes 49 due to the air ejected into the valve chamber 40 through the communication holes 43. As a result, the flow passage resistance of the valve section 12 can be minimized.

As illustrated in FIGS. 3 to 7, the diameter of the auxiliary holes 49 is greater than or equal to the diameter of the communication holes 43. Therefore, the manufacturer can easily visually determine whether or not the film 24 has a process defect or has been damaged or contaminated in the manufacturing process through the auxiliary holes 49 in the top plate 21.

Since the diameter of the auxiliary holes 49 is greater than or equal to the diameter of the communication holes 43 and the film 24 is translucent, the manufacturer can position the top plate 21, the film 24, and the bottom plate 23 while looking at the auxiliary holes 49 in the top plate 21 in the manufacturing process. More specifically, the manufacturer can easily arrange the communication holes 43, the ejection holes 41, the film holes 42, and the auxiliary holes 49 without displacement in the assembly process. Thus, the manufacturer can easily assemble the fluid control device 111.

Second Embodiment

A fluid control device 211 according to a second embodiment of the present disclosure will now be described.

Figure 11:
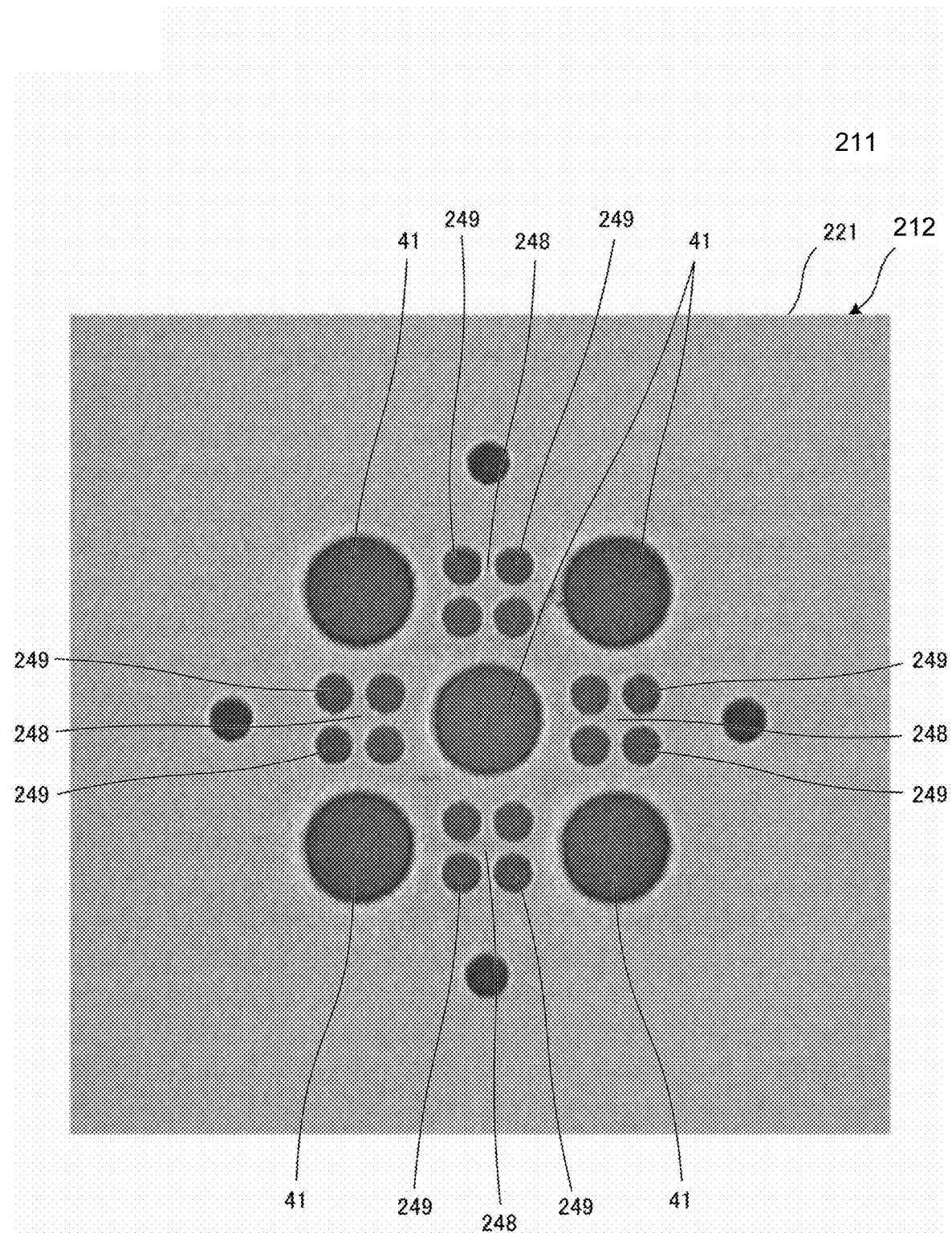
FIG. 11 is a front view of a central portion of a top plate 221 included in a fluid control device 211 according to a second embodiment of the present disclosure.
Figure 12:
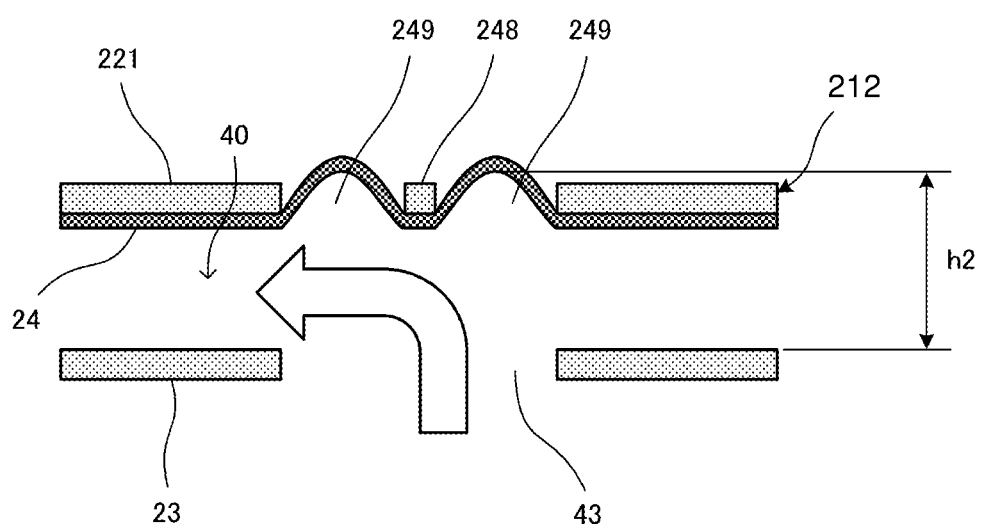
FIG. 12 is an enlarged sectional view illustrating the flow of air around auxiliary holes 249 while a blower section 13 included in the fluid control device 211 illustrated in FIG. 11 is in operation.

FIG. 11 is a front view of a central portion of a top plate 221 included in the fluid control device 211 according to the second embodiment of the present disclosure. FIG. 12 is an enlarged sectional view illustrating the flow of air around auxiliary holes 249 while a blower section 13 included in the fluid control device 211 illustrated in FIG. 11 is in operation. The arrow in FIG. 12 indicates the flow of air.

The fluid control device 211 differs from the fluid control device 111 in that the top plate 221 has crosspiece portions 248 that partition the auxiliary holes 249 from each other. Other structures are the same as those of the fluid control device 111, and description thereof is thus omitted.

Also in this structure, as illustrated in FIG. 12, while the blower section 13 is in operation, a portion of the film 24 that faces each auxiliary hole 249 is deformed into the auxiliary hole 249 due to the air ejected into the valve chamber 40 through the corresponding communication hole 43. Accordingly, the gap h2 between the bottom plate 23 and the film 24 increases. As a result, the flow passage resistance of the valve section 212 is lower and the flow rate and pressure of the air are higher than those in the case where the top plate 221 does not have the auxiliary holes 249.

Thus, the fluid control device 211 and the valve section 212 allow the air ejected from the blower section 13 to pass therethrough while minimizing reductions in the flow rate and pressure of the air.

In the above-described fluid control device 111, if the amount of the air ejected into the valve chamber 40 through the communication holes 43 suddenly increases, there is a risk that portions of the film 24 will be greatly deformed into the auxiliary holes 49 and become damaged (see FIG. 10).

In this structure, since the crosspiece portions 248 are provided between the auxiliary holes 249, the film 24 comes into contact with crosspiece portions 248, as illustrated in FIG. 12. Thus, the crosspiece portions 248 suppress deformation of the film 24, thereby preventing damage to the film 24. As a result, the durability of the valve section 212 and the fluid control device 211 is increased.

Third Embodiment

A fluid control device 311 according to a third embodiment of the present disclosure will now be described.

Figure 13:
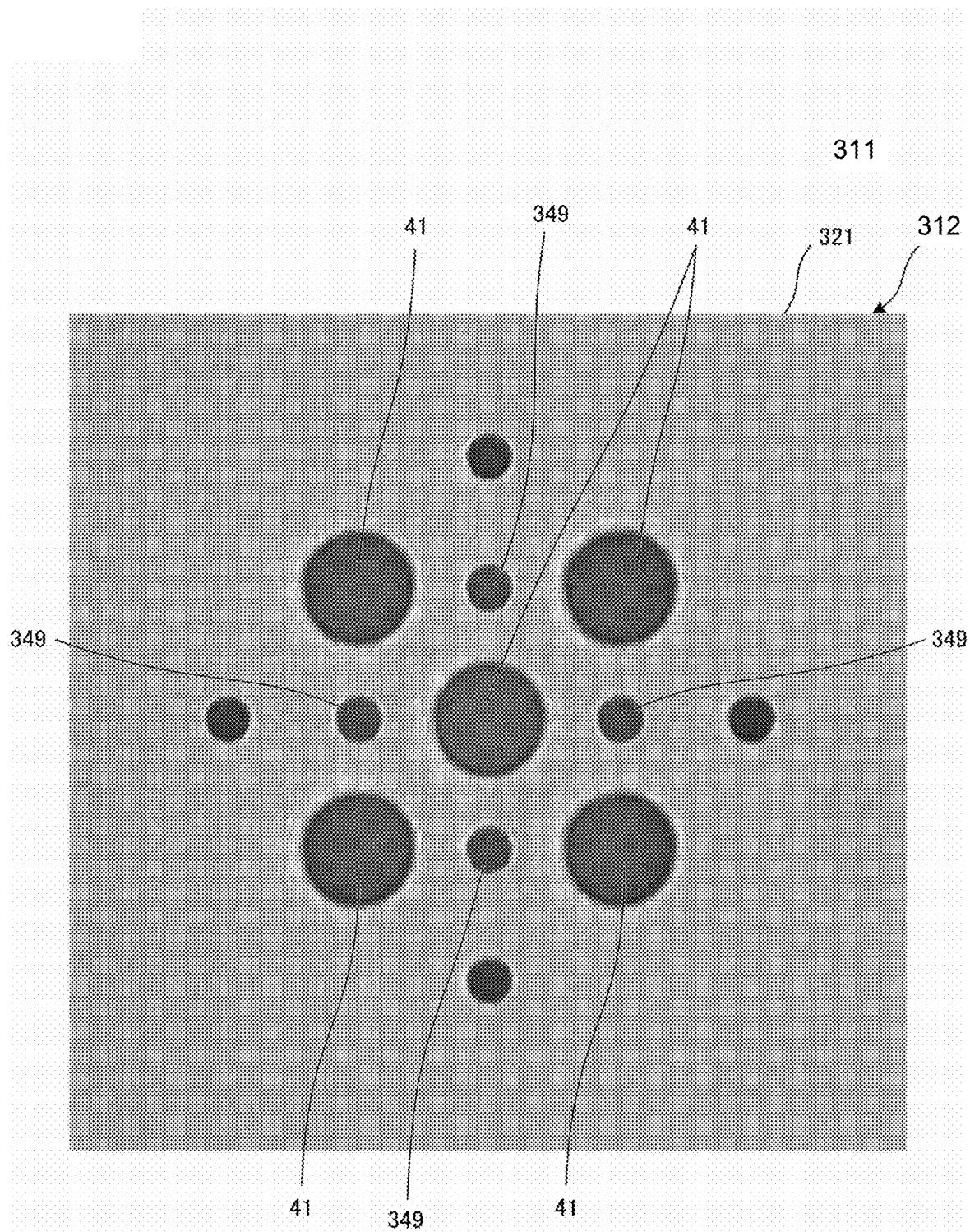
FIG. 13 is a front view of a central portion of a top plate 321 included in a fluid control device 311 according to a third embodiment of the present disclosure.

FIG. 13 is a front view of a central portion of a top plate 321 included in a valve section 312 of the fluid control device 311 according to the third embodiment of the present disclosure. The fluid control device 311 differs from the fluid control device 111 in that the diameter of auxiliary holes 349 is smaller than the diameter of communication holes 43. Other structures are the same as those of the fluid control device 111, and description thereof is thus omitted.

Also in this structure, while the blower section 13 is in operation, a portion of the film 24 that faces each auxiliary hole 349 is deformed into the auxiliary hole 349 due to the air ejected into the valve chamber 40 through the corresponding communication hole 43. Accordingly, the gap between the bottom plate 23 and the film 24 increases. As a result, the flow passage resistance is lower and the flow rate and pressure of the air are higher than those in the case where the top plate 321 does not have the auxiliary holes 349.

Thus, the fluid control device 311 and the valve section 312 allow the air ejected from the blower section 13 to pass therethrough while minimizing reductions in the flow rate and pressure of the air.

<<Experiment 1>>

The ejection performances of the fluid control device 111 and a fluid control device according to a comparative example while the blower section 13 is in operation will be compared. The fluid control device according to the comparative example differs from the fluid control device 111 in that the top plate 21 does not have the auxiliary holes 49. Other structures are the same as those of the fluid control device 111, and description thereof is thus omitted.

Figure 14:
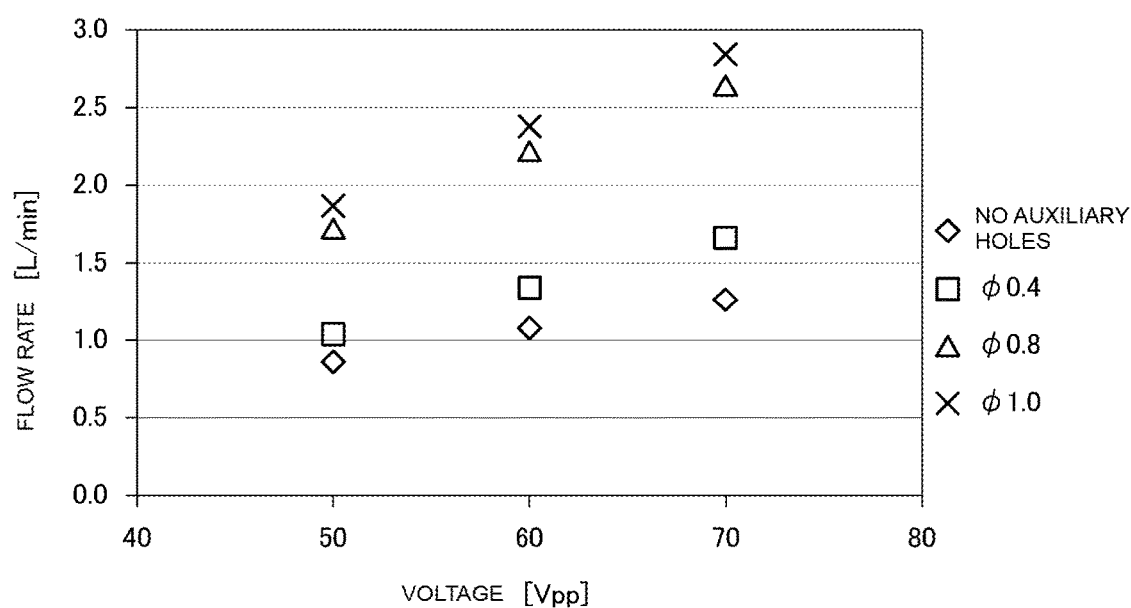
FIG. 14 is a graph showing the relationship between the ejection flow rate of the air ejected from the ejection holes 41 and the driving voltage in a plurality of fluid control devices 111 having the auxiliary holes 49 of different diameters and a fluid control device according to a comparative example.
Figure 15:
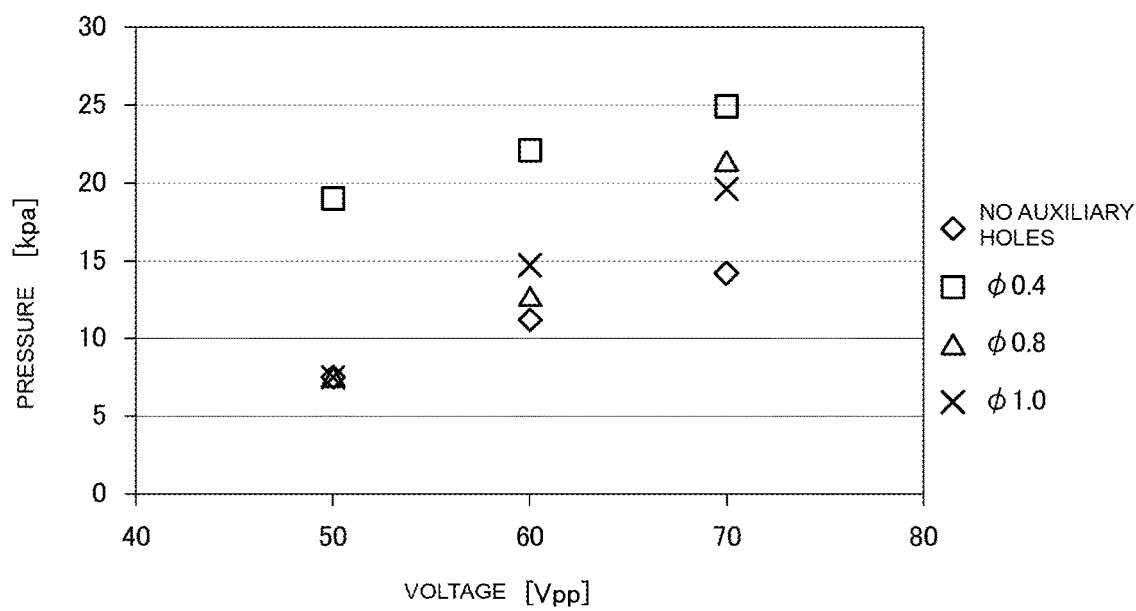
FIG. 15 is a graph showing the relationship between the ejection pressure of the air ejected from the ejection holes 41 and the driving voltage in the fluid control devices 111 having the auxiliary holes 49 of different diameters and the fluid control device according to the comparative example.

FIG. 14 is a graph showing the relationship between the ejection flow rate of the air ejected from the ejection holes 41 and the driving voltage in three fluid control devices 111 having the auxiliary holes 49 of different diameters and the fluid control device according to the comparative example. FIG. 15 is a graph showing the relationship between the ejection pressure of the air ejected from the ejection holes 41 and the driving voltage in the three fluid control devices 111 having the auxiliary holes 49 of different diameters and the fluid control device according to the comparative example.

FIGS. 14 and 15 show the result of the experiment performed on the three fluid control devices 111 having the auxiliary holes 49 of different diameters and the fluid control device according to the comparative example. In the experiment, a driving voltage having a predetermined frequency (for example, 17 kHz) was applied to the piezoelectric element 33 of each fluid control device, and the ejection flow rate and ejection pressure of the air ejected from the ejection holes 41 were measured.

In the experiment, the diameters of the auxiliary holes 49 in the three fluid control devices 111 were 0.4 µm, 0.8 µm, and 1.0 µm. The diameter of the communication holes 43 in the three fluid control devices 111 and the fluid control device of the comparative example was 0.8 µm.

As is clear from FIGS. 14 and 15, the result of the experiment shows that the ejection flow rate and ejection pressure of the fluid control devices 111 are greater than those of the fluid control device according to the comparative example.

The probable reason for this result is that the flow passage resistance of the valve section 12 is reduced due to the auxiliary holes 49 that are overlapped with the communication holes 43.

Thus, the fluid control device 111 and the valve section 12 allow the air ejected from the blower section 13 to pass therethrough while minimizing reductions in the flow rate and pressure of the air.

As illustrated in FIG. 14, the result of the experiment also shows that the ejection flow rate increases as the area of the auxiliary holes 49 that are overlapped the communication holes 43 increases. In particular, the ejection flow rate is high when the diameter of the auxiliary holes 49 is greater than the diameter of the communication holes 43.

As illustrated in FIG. 15, the result of the experiment also shows that the ejection pressure decreases as the area of the auxiliary holes 49 that are overlapped with the communication holes 43 increases. In particular, the ejection pressure is high when the diameter of the auxiliary holes 49 is smaller than the diameter of the communication holes 43.

Accordingly, in the valve section 12 according to the present embodiment, the ejection pressure or the ejection flow rate can be further increased without increasing the driving voltage (without increasing the power consumption) by adjusting the area of the auxiliary holes 49.

<<Experiment 2>>

The ejection performances of the fluid control device 211 and the fluid control device according to the comparative example, which does not have the auxiliary holes, while the blower section 13 is in operation will be compared.

Figure 16:
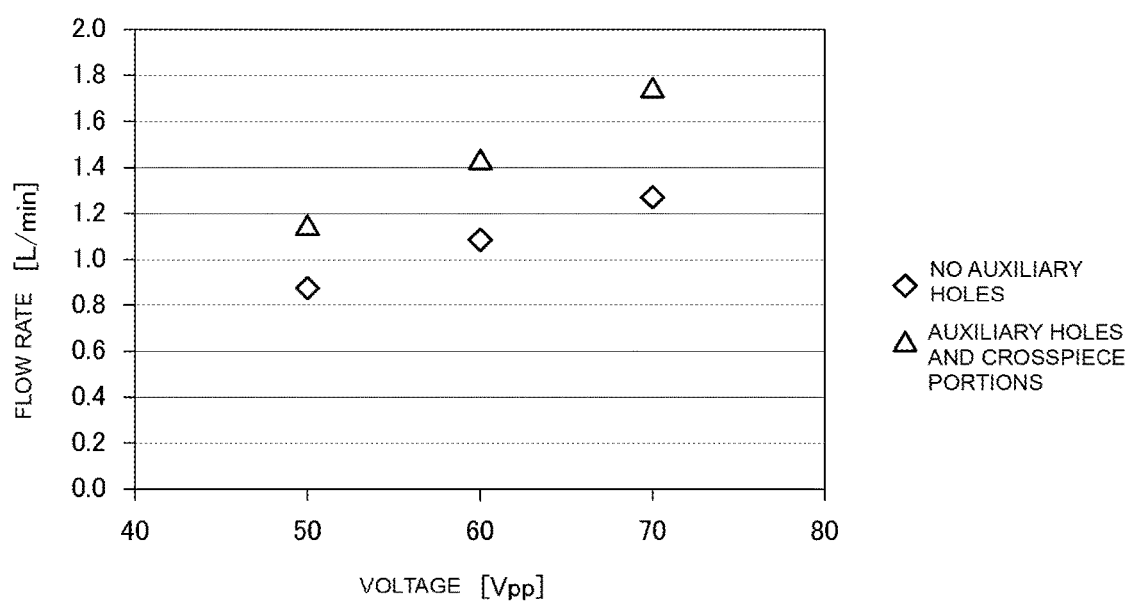
FIG. 16 is a graph showing the relationship between the ejection flow rate of the air ejected from the ejection holes 41 and the driving voltage in the fluid control device 211 and the fluid control device according to the comparative example.
Figure 17:
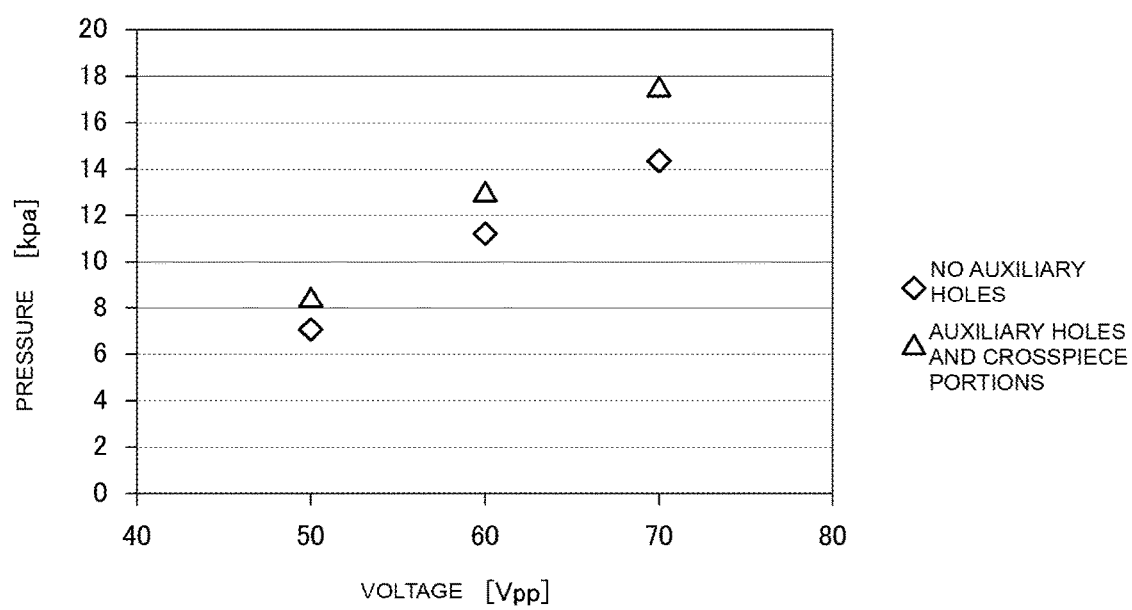
FIG. 17 is a graph showing the relationship between the ejection pressure of the air ejected from the ejection holes 41 and the driving voltage in the fluid control device 211 and the fluid control device according to the comparative example.

FIG. 16 is a graph showing the relationship between the ejection flow rate of the air ejected from the ejection holes 41 and the driving voltage in the fluid control device 211 and the fluid control device according to the comparative example. FIG. 17 is a graph showing the relationship between the ejection pressure of the air ejected from the ejection holes 41 and the driving voltage in the fluid control device 211 and the fluid control device according to the comparative example.

FIGS. 16 and 17 show the result of the experiment in which a driving voltage having a predetermined frequency (for example, 17 kHz) was applied to the piezoelectric element 33 of each of the fluid control device 211 and the fluid control device of the comparative example, and in which the ejection flow rate and ejection pressure of the air ejected from the ejection holes 41 were measured.

In the experiment, the diameter of each auxiliary hole 249 in the fluid control device 211 was 0.2 µm. The diameter of the communication holes 43 in the fluid control device 211 and the fluid control device of the comparative example was 0.8 µm.

As is clear from FIGS. 16 and 17, the result of the experiment shows that the ejection flow rate and ejection pressure of the fluid control device 211 are greater than those of the fluid control device according to the comparative example.

The probable reason for this result is that the flow passage resistance of the valve section 212 is reduced due to the auxiliary holes 249 that are overlapped with the communication holes 43.

Thus, the fluid control device 211 and the valve section 212 allow the air ejected from the blower section 13 to pass therethrough while minimizing reductions in the flow rate and pressure of the air.

In addition, as is clear from FIGS. 11 and 12, the crosspiece portions 248 suppress deformation of the film 24, thereby preventing damage to the film 24. As a result, the durability of the valve section 212 and the fluid control device 211 can be increased.

The displacement of the film 24 included in the fluid control device 111 and the displacement of the film 24 included in the fluid control device 311 while the blower section 13 is in operation will be compared.

Figure 18:
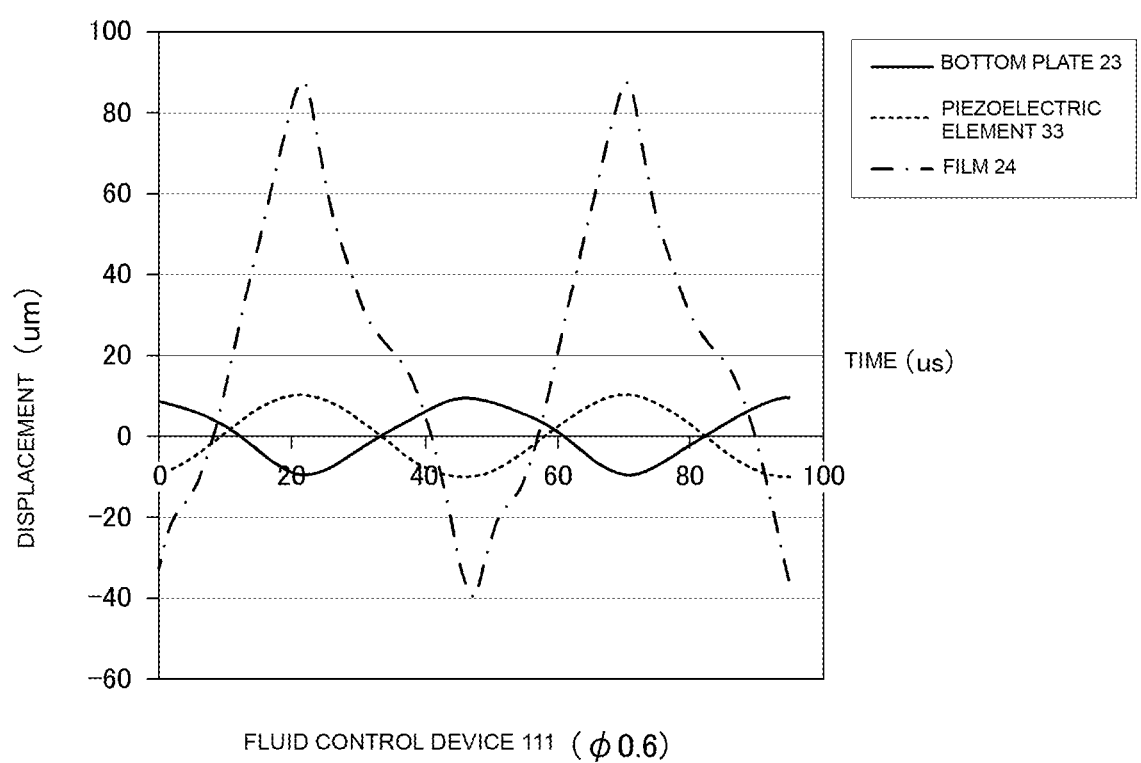
FIG. 18 is a graph showing variations in the displacements of the bottom plate 23, a piezoelectric element 33, and the film 24 included in the fluid control device 111.
Figure 19:
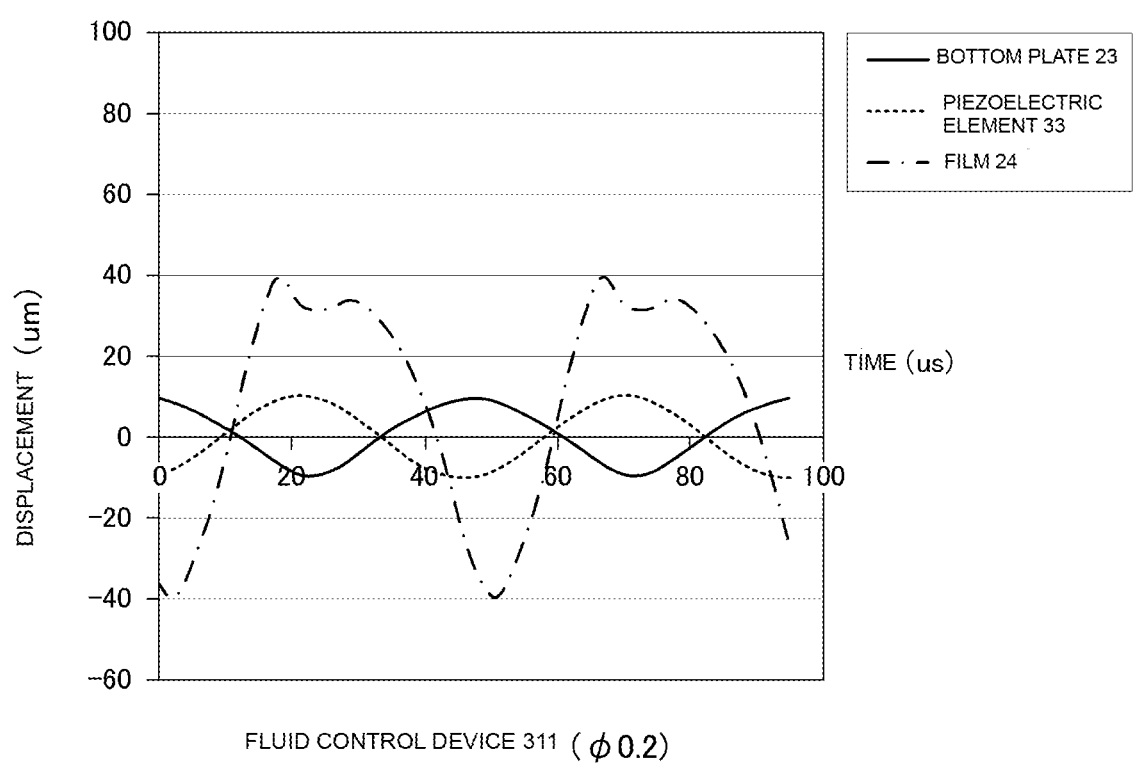
FIG. 19 is a graph showing variations in the displacements of a bottom plate 23, a piezoelectric element 33, and a film 24 included in the fluid control device 311.

FIG. 18 is a graph showing variations in the displacements of the bottom plate 23, the piezoelectric element 33, and the film 24 included in the fluid control device 111. FIG. 19 is a graph showing variations in the displacements of the bottom plate 23, the piezoelectric element 33, and the film 24 included in the fluid control device 311.

In FIGS. 18 and 19, the displacements of the bottom plate 23, the piezoelectric element 33, and the film 24 are measured by using a laser Doppler vibrometer. The laser Doppler vibrometer can be used to measure the displacement of the film 24 by irradiating the principal surface of the film 24 facing the valve chamber 40 with a laser beam through the auxiliary holes 49 and 349. The laser Doppler vibrometer can also be used to measure the displacement of the bottom plate 23 by irradiating the principal surface of the bottom plate 23 facing the valve chamber 40 with a laser beam through the ejection holes 41. The laser Doppler vibrometer can also be used to measure the displacement of the piezoelectric element 33 by irradiating the principal surface of the piezoelectric element 33 facing away from the blower chamber 45 with a laser beam.

As is clear from FIG. 18, the result of the experiment shows that, in the fluid control device 111, a portion of the film 24 that faces each auxiliary hole 49 is deformed into the auxiliary hole 49 by a large amount due to the air ejected into the valve chamber 40 through the corresponding communication hole 43.

In contrast, as illustrated in FIG. 19, in the fluid control device 311, a portion of the film 24 that faces each auxiliary hole 349 is deformed into the auxiliary hole 349 by a small amount due to the air ejected into the valve chamber 40 through the corresponding communication hole 43.

Thus, it has become clear that the amount of deformation is larger when the auxiliary holes 49, which have a diameter greater than or equal to that of the communication holes 43, are formed than when the auxiliary holes 349, which have a diameter smaller than that of the communication holes 43, are formed. In other words, the flow passage resistance of the valve section 12 having the auxiliary holes 49 is lower than the flow passage resistance of the valve section 312 having the auxiliary holes 349.

Therefore, it is conceivable that the auxiliary holes 49 preferably have a diameter greater than or equal to the diameter of the communication holes 43.

Other Embodiments

In the above-described embodiments, the fluid control devices 111, 211, and 311 each include the blower section 13. However, the fluid control devices 111, 211, and 311 are not limited to this, and may instead include another blower section.

Figure 20:
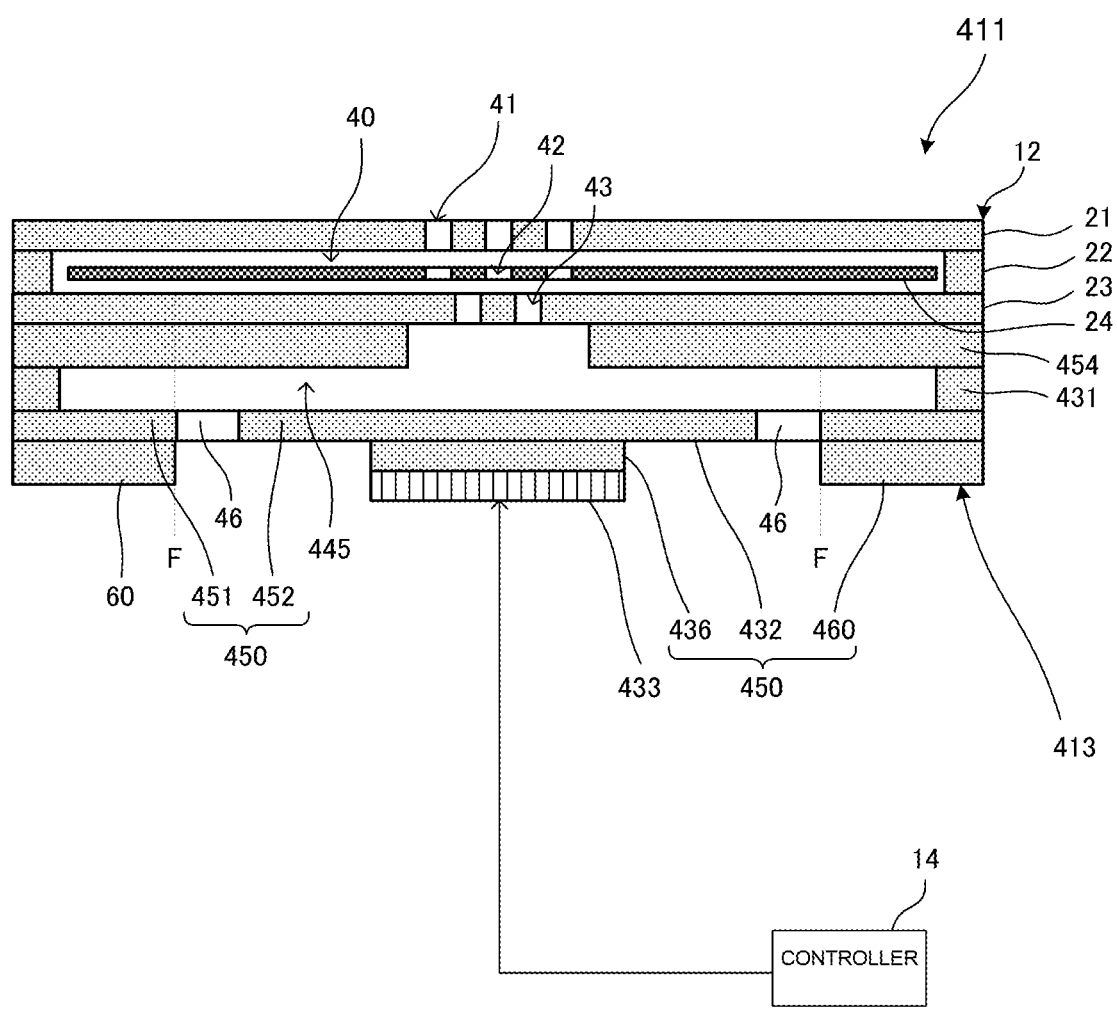
FIG. 20 is a sectional side view of a fluid control device 411 according to another embodiment of the present disclosure.

For example, as illustrated in FIG. 20, a fluid control device 411 may include the valve section 12, the controller 14, and a blower section 413. The blower section 413 includes a vibration adjustment plate 454, a side-wall plate 431, a vibrating body 450, and a piezoelectric element 433.

The vibration adjustment plate 454 has a size that differs from that of the vibration adjustment plate 54 illustrated in FIGS. 3 and 8 in the planar direction. Other structures are the same as those of the vibration adjustment plate 54, and description thereof is thus omitted.

The side-wall plate 431 has a size that differs from that of the side-wall plate 31 illustrated in FIGS. 3 and 8 in the planar direction. Other structures are the same as those of the side-wall plate 31, and description thereof is thus omitted.

The piezoelectric element 433 has a size that differs from that of the piezoelectric element 33 illustrated in FIGS. 3 and 8 in the planar direction. Other structures are the same as those of the piezoelectric element 33, and description thereof is thus omitted.

The vibrating body 450 includes a bottom plate 432, a reinforcing plate 436, and a restriction plate 460. The bottom plate 432 is disc-shaped, and is made of, for example, a stainless steel. The bottom plate 432 has suction holes 46.

The vibrating body 450 includes a peripheral region 451 and a central region 452. The peripheral region 451 extends from a node F, which is the outermost one of the nodes of pressure vibration in a blower chamber 445 generated by bending vibration of the vibrating body 450, to the outer periphery of the blower chamber 445. The central region 452 is a region inside the peripheral region 451. The peripheral region 451 is a region in which the bending vibration of the central region 452 is suppressed.

A restriction plate 460, which suppresses the bending vibration of the peripheral region 451, is joined to the principal surface of the bottom plate 432 that faces the piezoelectric element 433. Accordingly, the thickness of the peripheral region 451 is greater than that of the central region 452. Therefore, the rigidity of the peripheral region 451 is higher than that of the central region 452. The restriction plate 460 is annular, and is made of, for example, a stainless steel.

The reinforcing plate 436 is disc-shaped, and is made of, for example, a stainless steel. The reinforcing plate 436 is joined to the principal surface of the bottom plate 432 that faces away from the blower chamber 445. The reinforcing plate 436 prevents the piezoelectric element 433 from being damaged by being bent.

Similar to the fluid control device 111 illustrated in FIGS. 9A and 9B, when the fluid control device 411 having the above-described structure is in operation, air is sucked in through the suction holes 46 and ejected into the valve chamber 40 through the communication holes 43 in response to the bending vibration of the vibrating body 450.

Although air is used as the fluid in the above-described embodiments, the fluid is not limited to this. The fluid may instead be gas other than air.

In the above-described embodiments, the plates included in the valve section and the blower section are made of SUS. However, the plates are not limited to this, and may instead be made of another material, for example, aluminum, titanium, magnesium, or copper.

In addition, although the piezoelectric element is used as the drive source for the blower in the above-described embodiments, the drive source is not limited to this. For example, the blower may be electromagnetically driven to perform the pumping operation.

In addition, in the above-described embodiments, the piezoelectric element is made of a lead zirconate titanate ceramic. However, the piezoelectric element is not limited to this, and may instead be made of a lead-free piezoelectric ceramic material, such as a potassium sodium niobate ceramic or an alkali niobate ceramic.

Finally, it should be understood that the above-described embodiments are illustrative in all aspects and not restrictive. The scope of the present disclosure is defined not by the above-described embodiments but by the scope of the claims. Furthermore, the scope of the present disclosure is intended to include meanings equivalent to the scope of the claims and all modifications within the scope.

12 valve section
13 blower section
14 controller
21 top plate
22 side-wall plate
23 bottom plate
24 film
25 projection
26 cut portion
31 side-wall plate
32 bottom plate
33 piezoelectric element
34 outer peripheral portion
35 beam portion
36 diaphragm
37 piezoelectric actuator
40 valve chamber
41 ejection hole
42 film hole
43 communication hole
45 blower chamber
46 suction hole
48 blower lower chamber
49 auxiliary hole
54 vibration adjustment plate
55 blower upper chamber
111, 211 fluid control device
212 valve section
221 top plate
248 crosspiece portion
249 auxiliary hole
311 fluid control device
312 valve section
321 top plate
349 auxiliary hole
411 fluid control device
413 blower section
431 side-wall plate
432 bottom plate
433 piezoelectric element
436 reinforcing plate 445 blower chamber
450 vibrating body
451 peripheral region
452 central region
454 vibration adjustment plate
460 restriction plate

The invention claimed is:

1. A fluid control device comprising:
a blower including a blower chamber, a vibrating body facing the blower chamber, and a driving body generating bending vibration of the vibrating body; and
a valve comprising:
a first plate having a first vent hole,
a second plate defining a valve chamber connected to the first vent hole between the second plate and the first plate, the second plate having a second vent hole connected to the valve chamber and not opposed to the first vent hole, and
a film disposed between the first plate and the second plate, the film having a third vent hole opposed to the second vent hole and not opposed to the first vent hole,
wherein the second plate has an auxiliary hole overlapped with the first vent hole in a front view of a principal surface of the second plate, the principal surface facing to the valve chamber,
wherein the valve chamber is in fluid communication with the blower chamber via the first vent hole,
wherein the film is freely movable in a vertical direction between the first plate and the second plate,
wherein the blower includes a vibration adjustment plate that influences vibration of the valve, the vibration adjustment plate being an annular plate that defines an opening, and
wherein the first vent hole, second vent hole, and third vent hole overlap with the opening in the front view.

2. The fluid control device according to claim 1, wherein a central axis of the auxiliary hole coincides with a central axis of the first vent hole.

3. The fluid control device according to claim 1, wherein the auxiliary hole includes a plurality of auxiliary holes, and
wherein the second plate includes a crosspiece portion disposed between the plurality of auxiliary holes.

4. The fluid control device according to claim 1, wherein a diameter of the auxiliary hole is greater than a diameter of the first vent hole.

5. The fluid control device according to claim 1, wherein a diameter of the auxiliary hole is smaller than a diameter of the first vent hole.

6. The fluid control device according to claim 4, wherein the second vent hole includes a plurality of second vent holes disposed on both sides of the auxiliary hole, and
wherein, when rh is a radius of the first vent hole, Rs is a radius of the auxiliary hole, r1 and r2 are radii of two of the second vent holes disposed on both sides of the auxiliary hole, and a is a distance between center points of the two of the second vent holes disposed on both sides of the auxiliary hole, the following expression is satisfied: $\{a-(r1+r2)\}/2 > Rs \geq rh$.

7. The fluid control device according to claim 1,
wherein the vibrating body includes a peripheral region and a central region, the peripheral region extending from an outermost one of nodes of pressure vibration generated in the blower chamber by the bending vibration of the vibrating body to an outer periphery of the blower chamber, the central region being located inside the peripheral region, and
wherein the peripheral region is a region in which the bending vibration of the central region is suppressed.

8. The fluid control device according to claim 2, wherein the auxiliary hole includes a plurality of auxiliary holes, and
wherein the second plate includes a crosspiece portion disposed between the plurality of auxiliary holes.

9. The fluid control device according to claim 2, wherein a diameter of the auxiliary hole is greater than a diameter of the first vent hole.

10. The fluid control device according to claim 3, wherein a diameter of the auxiliary hole is greater than a diameter of the first vent hole.

11. The fluid control device according to claim 2, wherein a diameter of the auxiliary hole is smaller than a diameter of the first vent hole.

12. The fluid control device according to claim 3, wherein a diameter of the auxiliary hole is smaller than a diameter of the first vent hole.

13. The fluid control device according to claim 1, wherein the film comprises a disc-shaped body having a diameter that is smaller than a diameter of the valve chamber.

14. The fluid control device according to claim 1, wherein:
the fluid control device further comprises a side-wall plate between the first plate and second plate, the side-wall plate having a cutout portion along an inner periphery thereof, and
the film comprises a disc-shaped body and a projection that extends from the disc-shaped body and is disposed within the cutout portion of the side-wall plate.

15. The fluid control device according to claim 1, wherein the vibration adjustment plate is provided on the valve such that the vibration adjustment plate overlaps with the valve in the front view.

16. A fluid control device comprising:
a blower including a blower chamber, a vibrating body facing the blower chamber, and a driving body generating bending vibration of the vibrating body; and
a valve comprising:
a first plate having a first vent hole,
a second plate defining a valve chamber connected to the first vent hole between the second plate and the first plate, the second plate having a second vent hole connected to the valve chamber and not opposed to the first vent hole, and
a film disposed between the first plate and the second plate, the film having a third vent hole opposed to the second vent hole and not opposed to the first vent hole,
wherein the second plate has a plurality of auxiliary holes and a crosspiece portion disposed between the auxiliary holes, the auxiliary holes and crosspiece portion overlapping with the first vent hole in a front view of a principal surface of the second plate, the principal surface facing to the valve chamber.

17. The fluid control device according to claim 16, wherein the valve chamber is in fluid communication with the blower chamber via the first vent hole.

18. The fluid control device according to claim 17, wherein the film is freely movable in a vertical direction between the first plate and the second plate.

19. A fluid control device comprising:
a blower including a blower chamber, a vibrating body facing the blower chamber, and a driving body generating bending vibration of the vibrating body; and
a valve comprising:
a first plate having a first vent hole, a second plate defining a valve chamber connected to the first vent hole between the second plate and the first plate, the second plate having a second vent hole connected to the valve chamber and not opposed to the first vent hole, and a film disposed between the first plate and the second plate, the film having a third vent hole opposed to the second vent hole and not opposed to the first vent hole, wherein the second plate has an auxiliary hole overlapped with the first vent hole in a front view of a principal surface of the second plate, the principal surface facing to the valve chamber, wherein the valve chamber is in fluid communication with the blower chamber via the first vent hole, wherein the film is freely movable in a vertical direction between the first plate and the second plate, and wherein the blower includes an annular plate that is provided on the valve such that the annular plate overlaps with the valve in the front view.

20. The fluid control device according to claim 19, wherein the annular plate of the blower defines an opening and is provided on the first plate of the valve such that a central region of the first plate is exposed to the blower chamber via the opening, and a peripheral region of the first plate overlaps with the annular plate in the front view.

* * * * *